(12) United States Patent
Mireault et al.

(10) Patent No.: US 12,124,152 B2
(45) Date of Patent: Oct. 22, 2024

(54) CAMERA WITH FOLDED OPTICS

(71) Applicant: Apple Inc., Cupertino, CA (US)

(72) Inventors: Alfred N. Mireault, San Francisco, CA (US); Scott W. Miller, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/190,011

(22) Filed: Mar. 24, 2023

(65) Prior Publication Data

US 2023/0229062 A1 Jul. 20, 2023

Related U.S. Application Data

(63) Continuation of application No. 17/665,295, filed on Feb. 4, 2022, now Pat. No. 11,614,674, which is a
(Continued)

(51) Int. Cl.
*H04N 23/67* (2023.01)
*G02B 13/00* (2006.01)
*G03B 13/36* (2021.01)

(52) U.S. Cl.
CPC ......... *G03B 13/36* (2013.01); *G02B 13/0065* (2013.01); *H04N 23/67* (2023.01)

(58) Field of Classification Search
CPC ............ G03B 13/36; G03B 2205/0015; G03B 2205/0069; G03B 3/10; G03B 5/00; G03B 17/17; G03B 30/00; G03B 3/00; G03B 5/02; G03B 17/12; G03B 2205/0007; G03B 2205/0046; G02B 13/0065; G02B 7/08;
(Continued)

(56) References Cited

U.S. PATENT DOCUMENTS 7,274,518 B1 9/2007 Tang et al.
8,014,080 B1 9/2011 Chen et al.
(Continued)

FOREIGN PATENT DOCUMENTS

CN 107533211 1/2018
CN 108780207 11/2018
(Continued)

OTHER PUBLICATIONS

Notice of Preliminary Rejection from Korean Patent Application No. 10-2022-7008557, dated Sep. 18, 2023, pp. 1-11, (English Translation Included).
(Continued)

*Primary Examiner* — Mekonnen D Dagnew
(74) *Attorney, Agent, or Firm* — Robert C. Kowert; Kowert, Hood, Munyon, Rankin & Goetzel, P.C.

(57) ABSTRACT

Various embodiments include a camera with folded optics and lens shifting capabilities. In some examples, a folded optics arrangement of the camera may include one or more lens elements and one or more light path folding elements (e.g., a prism). Some embodiments include voice coil motor (VCM) actuator arrangements, carrier arrangements, and/or suspension arrangements to provide autofocus (AF) and/or optical image stabilization (OIS) movement. Furthermore, some embodiments include position sensor arrangements for position sensing with respect to AF and/or OIS movement.

20 Claims, 18 Drawing Sheets

Related U.S. Application Data continuation of application No. 17/023,972, filed on Sep. 17, 2020, now Pat. No. 11,243,455.

(60) Provisional application No. 62/906,034, filed on Sep. 25, 2019.

(58) Field of Classification Search
CPC ...... G02B 27/646; H04N 23/67; H04N 23/50; H04N 23/54; H04N 23/55; H04N 23/6812; H04N 23/686; H04N 23/687; H02K 33/18
See application file for complete search history.

(56) References Cited

U.S. PATENT DOCUMENTS

| | | | |
|---|---|---|---|
| 8,373,774 | B2 | 2/2013 | Hosoya et al. |
| 10,070,060 | B2 | 9/2018 | Goldenberg et al. |
| 11,243,455 | B2 | 2/2022 | Mireault et al. |
| 11,614,674 | B2 | 3/2023 | Mireault et al. |
| 2004/0141065 | A1 | 7/2004 | Hara et al. |
| 2013/0229571 | A1* | 9/2013 | Martinez ................ G03B 17/04 29/829 |
| 2019/0049822 | A1 | 2/2019 | Avivi et al. |
| 2019/0243112 | A1 | 8/2019 | Yao et al. |
| 2019/0361323 | A1* | 11/2019 | Jerby ................ G03B 17/04 |
| 2020/0081321 | A1 | 3/2020 | Tseng et al. |
| 2020/0371374 | A1* | 11/2020 | Barak ................ H04N 23/55 |

FOREIGN PATENT DOCUMENTS

| | | |
|---|---|---|
| JP | 2004253846 | 9/2004 |
| KR | 20110051277 | 5/2011 |
| KR | 20110107412 | 4/2012 |
| KR | 20130055661 | 5/2013 |
| KR | 10-2017-0118943 | 10/2017 |
| KR | 10-2017-0126993 | 11/2017 |
| KR | 20180031070 | 3/2018 |
| WO | 2016166730 | 10/2016 |
| WO | 2019150188 | 8/2019 |

OTHER PUBLICATIONS

International Search Report and Written Opinion from PCT/US2020/051771, dated Jan. 29, 2021, pp. 1-14.
Office Action from Chinese Application No. 202080064575.3, dated Sep. 15, 2023, pp. 1-11 (English Translation included).
Notice of Allowance from Korean Patent Application No. 10-2022-7008557, dated May 21, 2024, pp. 1-5.

* cited by examiner

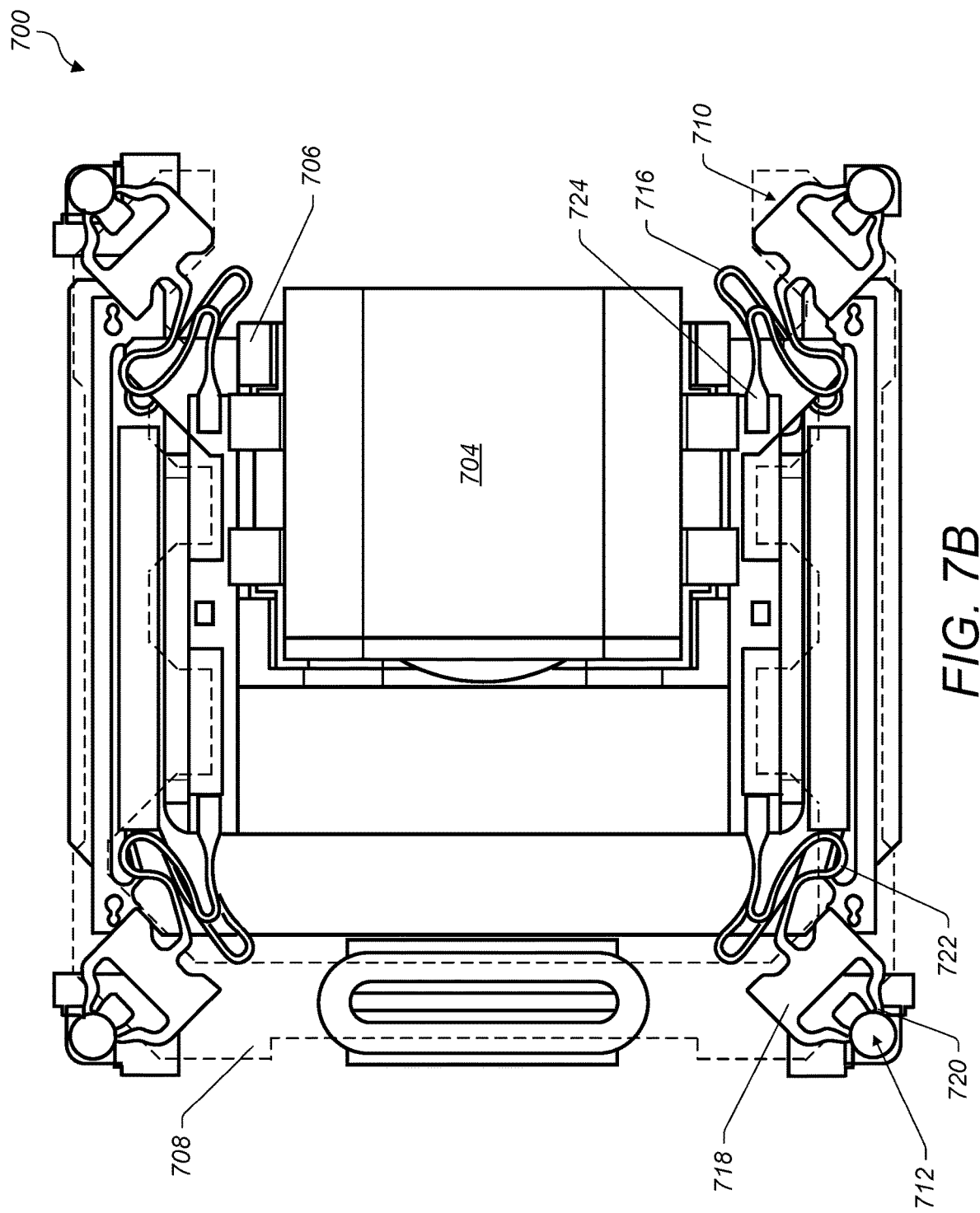

CAMERA WITH FOLDED OPTICS

This application is a continuation of U.S. patent application Ser. No. 17/665,295, filed Feb. 4, 2022, which is a continuation from U.S. patent application Ser. No. 17/023,972, filed Sep. 17, 2020, 11,243,455, which claims benefit of priority to U.S. Provisional Application No. 62/906,034, filed Sep. 25, 2019, which are hereby incorporated by reference in their entirety.

BACKGROUND

Technical Field

This disclosure relates generally to architecture for a camera with folded optics and lens shifting capabilities.

Description of the Related Art

The advent of small, mobile multipurpose devices such as smartphones and tablet or pad devices has resulted in a need for high-resolution, small form factor cameras for integration in the devices. Some small form factor cameras may incorporate optical image stabilization (OIS) mechanisms that may sense and react to external excitation/disturbance by adjusting location of the optical lens on the X and/or Y axis in an attempt to compensate for unwanted motion of the lens. Some small form factor cameras may incorporate an autofocus (AF) mechanism whereby the object focal distance can be adjusted to focus an object plane in front of the camera at an image plane to be captured by the image sensor. In some such autofocus mechanisms, the optical lens is moved as a single rigid body along the optical axis of the camera to refocus the camera.

BRIEF DESCRIPTION OF THE DRAWINGS

FIGS. 7A-7C each illustrate a respective view of an example suspension arrangement for a camera having a folded optics arrangement, in accordance with some embodiments. FIG. 7A shows a perspective view of the suspension arrangement. FIG. 7B shows a top view of the suspension arrangement. FIG. 7C shows a side view of the suspension arrangement.

FIG. 8A shows a perspective view of the position sensor arrangement. The position sensor arrangement may include position sensors for position sensing with respect to AF movement, OIS-Y movement, and OIS-Z movement. FIG. 8B shows a detail view that focuses on position sensing with respect to AF movement. FIGS. 8C-8D each shows a respective detail view that focuses on position sensing with respect to OIS-Y movement.

FIG. 8E shows a detail view that focuses on position sensing with respect to OIS-Z movement.

FIG. 9A shows a perspective view of the position sensor arrangement. The position sensor arrangement may include position sensors for position sensing with respect to AF movement, OIS-Z movement, and OIS-Y movement. FIG. 9B shows a cross-sectional view that focuses on position sensing with respect to AF movement. FIG. 9C shows a cross-sectional view that focuses on position sensing with respect to OIS-Z and OIS-Y movement.

Figure 1:
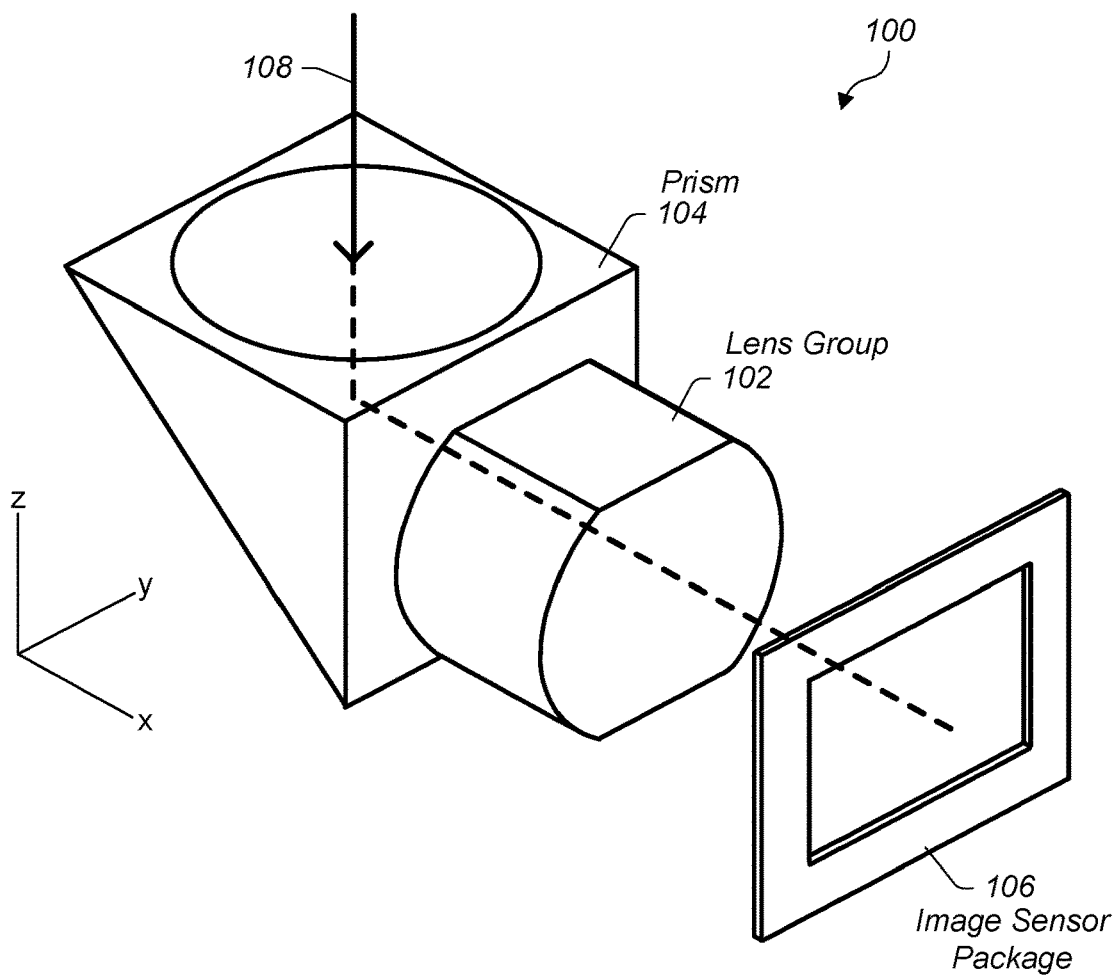
FIG. 1 illustrates a perspective view of an example camera with a folded optics arrangement, in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Some embodiments include camera equipment outfitted with controls, magnets, and voice coil motors to improve the effectiveness of a miniature actuation mechanism for a compact camera module. More specifically, in some embodiments, compact camera modules include actuators to deliver functions such as autofocus (AF) and/or optical image stabilization (OIS). One approach to delivering a very compact actuator for AF and/or OIS is to use a voice coil motor (VCM) actuator.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

Described here are folded optics arrangements for providing a reduced-height imaging system. The arrangements discussed throughout generally comprise one or more lenses and one or more light path folding elements (e.g., a prism, a mirror, etc.), which collectively provides a folded light path. The one or more lenses may be moveable the light path folding element(s) and/or an image sensor to provide autofocus and/or image stabilization during imaging. FIG. 1 shows a generalized example of a camera 100 with a folded optics arrangement. The example X-Y-Z coordinate system shown in FIG. 1 is used to discuss aspects of systems and/or system components, and may apply to embodiments described throughout this disclosure.

In various embodiments, the camera 100 may include a lens group 102, a prism 104, and an image sensor package 106. The lens group 102 may include one or more lens elements. In some embodiments, the lens group 102 may be located between the prism 104 and the image sensor package 106. Light may follow an optical path 108 that is folded by the prism 104 such that the light is directed towards the lens group 102, passes through the lens group 102, and propagates towards the image sensor package 106. In some examples, light may enter an object side of the prism 104 along the Z-axis. The prism 104 may redirect the light to propagate along the X-axis (which may be parallel to an optical axis defined by the lens group 102) towards the lens group 102 and the image sensor package 106. The prism 104, the lens group 102, and/or the image sensor package 106 may be positioned along a common axis (e.g., the X-axis, the optical axis defined by the lens group 102, etc.). According to some examples, the optical path 108 may be contained within a plane (e.g., the X-Z plane), and the image sensor package 106 may extend along a different plane (e.g., the Y-Z plane).

In some embodiments, the object side of the prism 104 may extend along the X-Y plane. Furthermore, the prism 104 may include a pair of opposing lateral sides that each extend along the X-Z plane, a lens group facing side that extends along the Y-Z plane, and a reflecting surface side that is angled relative to one or more of the other sides of the prism 104. For example, the reflecting surface side of the prism 104 may include a reflective surface that is angled so as to redirect light received from the object side of the prism 104 towards the lens group 102 (via the lens group facing side of the prism 104) and/or the image sensor package 106, as discussed above.

While the light path folding element(s) are shown in various figures as comprising prisms (e.g., the prism 104), the camera systems and/or folded optics arrangements described herein may include any suitable light path folding element (e.g., a mirror or the like) or combination of elements. In some embodiments, one or more of the light path folding elements may also act as a lens element (or combination of lens elements). For example, one or more lens elements (e.g., other than those of the lens group 102) may be integrated with the prism 104 such that the prism acts as a lens element. Additionally, or alternatively, the prism 104 may be shaped such that the prism 104 acts as a lens element.

Figure 2:
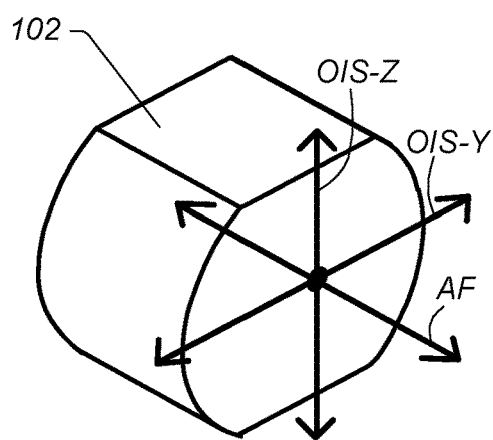
FIG. 2 illustrates an example of 3-axis movement of a lens group within a folded optics arrangement, in accordance with some embodiments.

As will be discussed in further detail below, the lens group 102 may be coupled with an actuator structure that is configured to move the lens group 102 along multiple axes, e.g., to provide autofocus (AF) and/or optical image stabilization (OIS) functionality. FIG. 2 shows an example of 3-axis movement of the lens group 102 to provide AF and/or OIS functionality. For example, the lens group 102 may be shifted (e.g., by an actuator structure, such as the actuator structures/arrangements discussed in further detail below) along the X-axis to provide AF movement. Additionally, or alternatively, the lens group 102 may be shifted along the Z-axis to provide OIS-Z movement (e.g., movement that shifts the image projected on the image sensor package 106 in one or more directions parallel to the Z-axis). Additionally, or alternatively, the lens group 102 may be shifted along the Y-axis to provide OIS-Y movement (e.g., movement that shifts the image projected on the image sensor package 106 in one or more directions parallel to the Y-axis). Components of the camera 100 (e.g., the lens group 102, the prism 104, and/or the image sensor package 106, etc.) may be used with any of the actuator arrangements described in the following figures.

Figure 3:
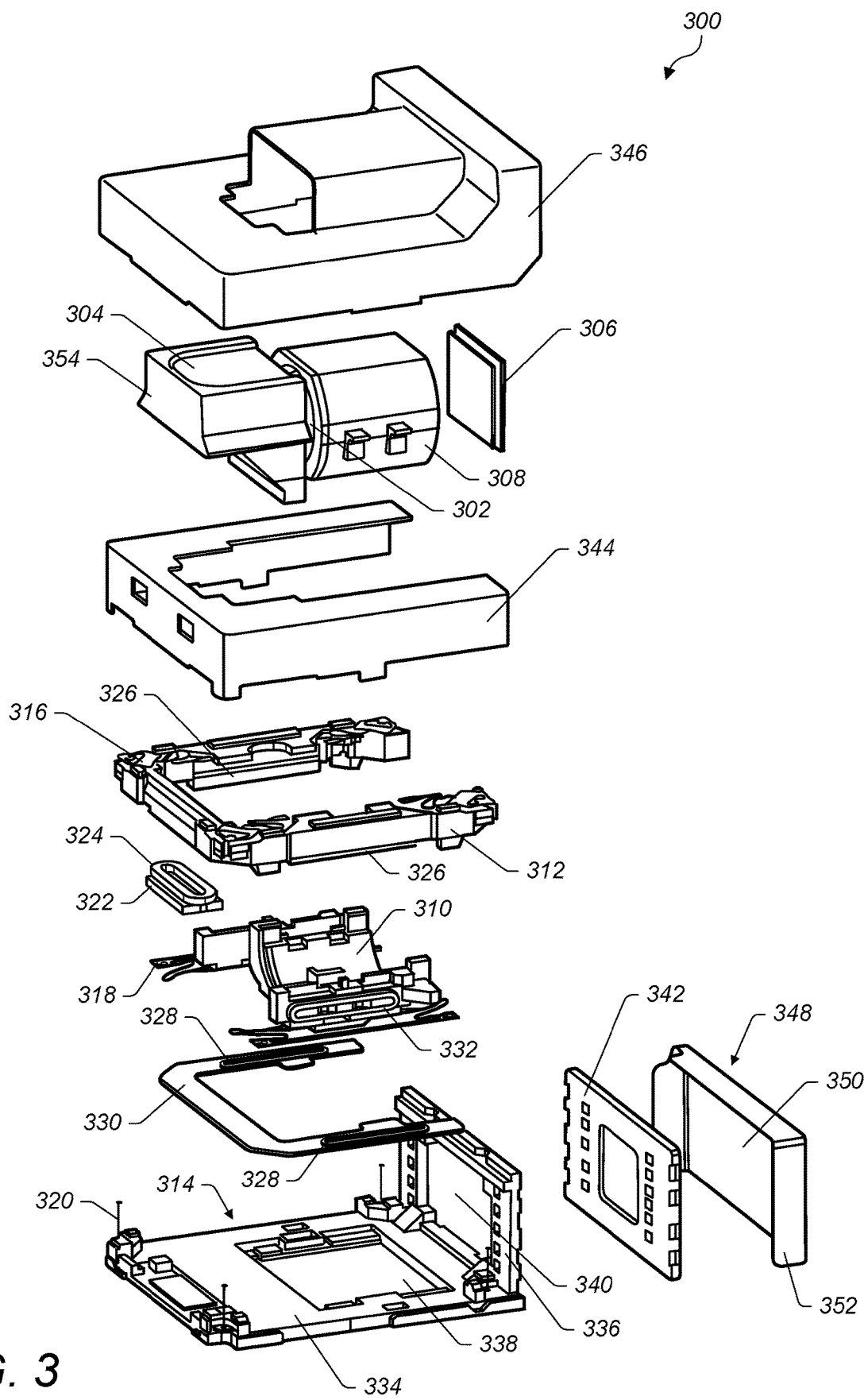
FIG. 3 illustrates an exploded view of an example camera having a folded optics arrangement, in accordance with some embodiments.
Figure 4:
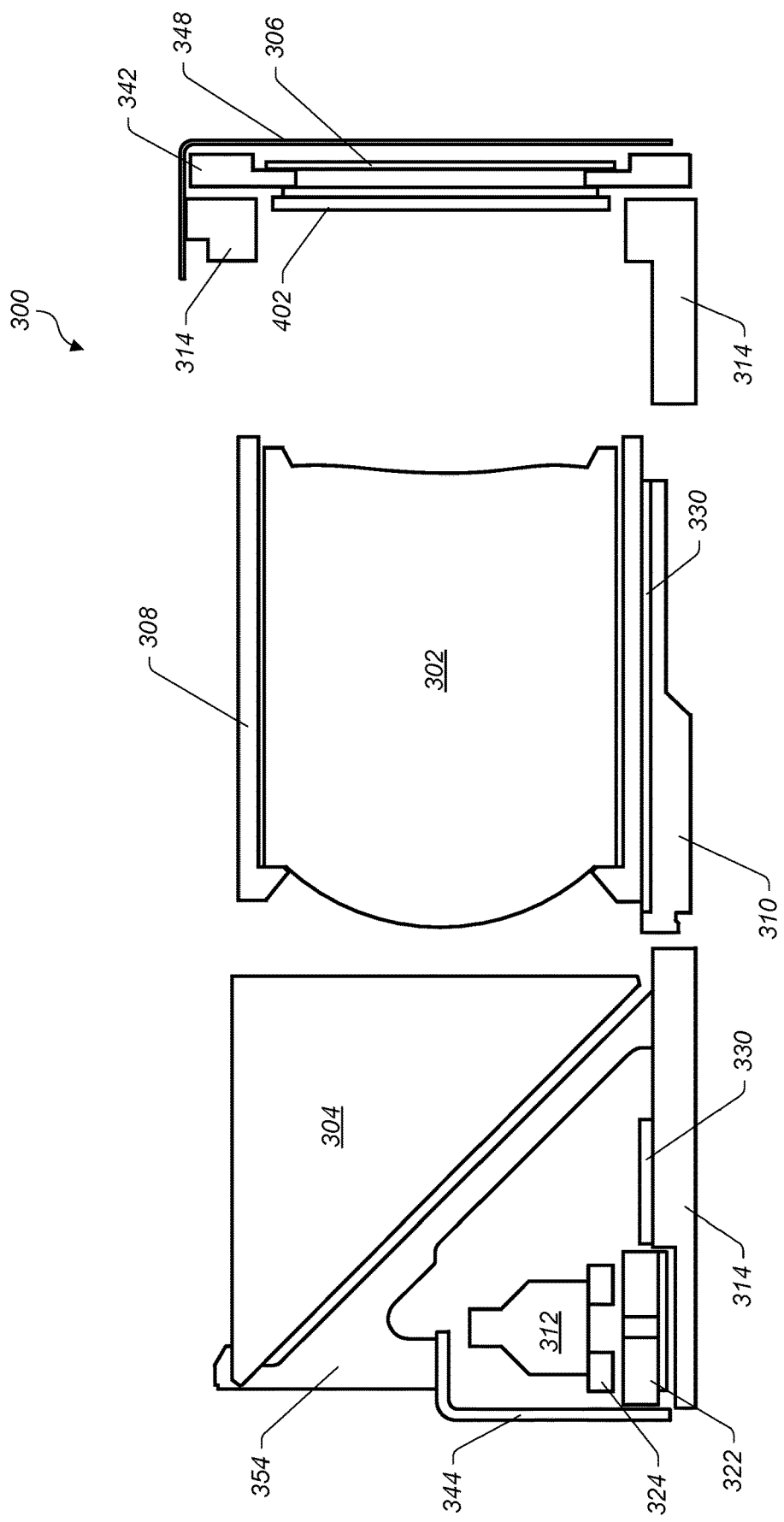
FIG. 4 illustrates a side cross-sectional view of an example camera having a folded optics arrangement, in accordance with some embodiments.

As mentioned above, the camera systems described here may comprise an actuator system to move the lens group relative to one or more light path folding elements (e.g., the prism 104). The actuator arrangements described here may generally comprise one or more carrier structures (e.g., the inner carrier structures and/or the outer carrier structures of the carrier arrangements discussed below), one or more suspension structures for moveably holding the carrier structure(s) relative to the rest of the camera and/or for moveably holding a carrier structure relative to another carrier structure, and an actuator module for controlling movement of the carrier structure(s). FIGS. 3 and 4 illustrate an exploded view and a side cross-sectional view, respectively, of an example camera 300 with a folded optics arrangement.

In some embodiments, the camera 300 may include a lens group 302, a prism 304, and an image sensor 306. The lens group 302 may include one or more lens elements disposed within a lens barrel 308.

As will be discussed in further detail below, the camera 300 may include an actuator module that provides for shifting the lens group 302 along multiple axes, e.g., to provide AF and/or OIS movement. In some embodiments, the actuator module may comprise a voice coil motor (VCM) actuator module that includes one or more VCM actuators. For instance, the actuator module may include one or more magnets and one or more coils. The magnets and coils may magnetically interact (e.g., when electrical current is provided to the coils) to produce Lorentz forces that move the lens group 302.

According to various embodiments, the camera 300 may include a carrier arrangement that includes an inner carrier structure (e.g., the lens barrel 308 and/or a lens carrier 310) and an outer carrier structure (e.g., a magnet holder 312 and/or a magnet frame). In some embodiments, the magnet holder 312 may extend at least partially around the prism and the lens barrel 308 (and the lens group 302). For instance, as shown in FIG. 3, the magnet holder 312 may be U-shaped in some embodiments.

The magnet holder 312 may have multiple sides and/or portions. For example, the magnet holder 312 may have a first side, a second side, and a third side. The first side may be a lateral side extending along the X-axis and along the side surfaces of the optical elements. The second side may be a lateral side extending along the X-axis and along opposite side surfaces of the optical elements. The third side may be a distal/object side extending along the Y-axis, and may be positioned behind at least a portion of the reflecting surface side of the prism 304 (e.g., such that the prism 304 is disposed between the lens group 302 and the magnet holder 312).

According to some examples, a first portion of the magnet holder 312 (e.g., the first side of the magnet holder 312) may extend proximate a first side of the lens barrel 308, a second portion of the magnet holder 312 (e.g., the second side of the magnet holder 312) may extend proximate a second side of the lens barrel 308 that is opposite the first side of the lens barrel 308, and a third portion of the magnet holder 312 (e.g., the third side of the magnet holder 312) may be tucked under a portion of the prism 304 and may extend from the first portion to the second portion, e.g., as shown in FIG. 4. In some embodiments, the magnet holder 312 (and/or outer carrier structure) may have a different number of sides and/or a different combination of sides than shown in FIGS. 3 and 4.

As will be discussed below with reference to FIGS. 7A-7C, the inner carrier structure (e.g., lens barrel 308 and/or lens carrier 310) may be suspended from the outer carrier structure (e.g., magnet holder 312) via a suspension arrangement. Additionally, or alternatively, the outer structure may be suspended from a fixed (or static) structure (e.g., base structure 314). In some embodiments, the suspension arrangement may include one or more top springs 316, one or more bottom springs 318, and/or one or more suspension wires 320. The suspension arrangement may allow the inner carrier structure to move relative to the outer carrier structure. Furthermore, the suspension arrangement may allow the inner structure to move together with the outer carrier structure relative to the fixed structure. In various examples, the lens carrier 310 may be fixedly attached to the lens barrel 308, and the lens barrel 308 may be fixedly attached to the lens group 302. As such, movement of the lens carrier 310 and/or the lens barrel 308 (e.g., due to actuation of one or more actuators of the actuator module) may cause movement of the lens group 302, such that the lens group 302 moves together with the lens barrel 308 and the lens carrier 310. According to some embodiments, the fixed structure may include a component of the camera 300 to which the carrier arrangement is moveably connected (e.g., via suspension elements). The fixed structure may be fixed relative to movement of the carrier arrangement. In some examples, the fixed structure may include multiple components that are joined or otherwise fixed relative to each other.

In various embodiments, the actuator module may include one or more AF VCM actuators and/or one or more OIS VCM actuators. In some embodiments, the actuator module may include an AF VCM actuator (e.g., to provide AF movement), an OIS-Y VCM actuator (e.g., to provide OIS-Y movement), and an OIS-Z VCM actuator (e.g., to provide OIS-Z movement), each of which may include one or more magnets and one or more coils.

In some examples, the AF VCM actuator may include an AF magnet 322 (e.g., a single-pole magnet, a dual-pole magnet, etc.) and an AF coil 324. The AF magnet 322 may be attached to the base structure 314. The AF coil 324 may be attached to the magnet holder 312. In some embodiments, the AF magnet 322 may have a longest dimension that is substantially parallel to a longest dimension of the AF coil 324. In some embodiments, the AF coil 324 may be oriented such that directions of current flow through the AF coil 324 define a plane that is substantially parallel to a surface of the base structure 314 (e.g., the surface on which the AF magnet 322 is mounted) and/or substantially parallel to the X-Y plane. The AF magnet 322 and the AF coil 324 may be located proximate one another, and the AF coil 324 may be electrically driven to magnetically interact with the AF magnet 322 to produce Lorentz forces that move the AF coil 324, the magnet holder 312, and/or the lens group 302 along an axis (e.g., along the X-axis) to provide AF movement. The AF magnet 322, being attached to the base structure 314, may remain stationary relative to the movement of the AF coil 324. In various embodiments, the AF VCM actuator may be tucked within a space under a portion of the prism 304, e.g., as indicated in FIG. 4. In this manner, the impact of the AF VCM actuator on the dimension of the system along its long axis (e.g., the X-axis) and along its vertical axis (e.g., the Z-axis) may be reduced or eliminated.

In some embodiments, the OIS-Y VCM actuator and the OIS-Z VCM actuator may share one or more OIS magnets 326 (also referred to herein as "shared OIS magnets"). In some embodiments, the shared OIS magnets 326 may be dual-pole magnets. The shared OIS magnets 326 may be attached to the magnet holder 312, e.g., at opposing sides of the lens group 302.

According to some examples, the OIS-Y VCM actuator may include one or more OIS-Y coils 328. The OIS-Y coils 328 may be coupled to the base structure 314. For example, the OIS-Y coils may be on a flex circuit 330 that is attached or otherwise coupled to the base structure 314. In some embodiments, each OIS-Y coil 328 may be located below a respective shared OIS magnet 326. The OIS-Y coils 328 may be electrically driven to magnetically interact with the shared OIS magnets 326 to produce Lorentz forces that move the shared OIS magnets 326, the magnet holder 312, and/or the lens group 302 along an axis (e.g., along the Y-axis) to provide OIS-Y movement (e.g., movement that shifts an image projected on the image sensor 306 in one or more directions parallel to the Y-axis). The OIS-Y coils 328, being coupled to the base 314, may remain stationary relative to the movement of the shared OIS magnets 326. In some embodiments, each of the shared OIS magnets 326 may have respective longest dimensions that are substantially parallel to respective longest dimensions of the OIS-Y coils 328. In some embodiments, the respective longest dimensions of the shared OIS magnets 326 and the OIS-Y coils 328 may be substantially parallel to a longest dimension of the system. Furthermore, the respective longest dimensions of the shared OIS magnets 326 and the OIS-Y coils 328 may be substantially orthogonal to the respective longest dimensions of the AF magnet 322 and the AF coil 324 in some embodiments. According to various embodiments, the OIS-Y coils 328 may be oriented such that directions of current flow through the OIS-Y coils 328 define a respective plane that is substantially parallel to a surface of the base structure 314.

According to some examples, the OIS-Z VCM actuator may include one or more OIS-Z coils 332. The OIS-X coils 332 may be attached to the lens carrier 310 (and/or the lens barrel 308). In some embodiments, each OIS-Z coil 332 may be located between a respective shared OIS magnet 326 and the lens group 302. The OIS-Z coils 332 may be electrically driven to magnetically interact with the shared OIS magnets 326 to produce Lorentz forces that move the OIS-Z coils 332, the lens carrier 310 (and/or the lens barrel 308), and the lens group 302 along an axis (e.g., along the Z-axis), relative to the magnet holder 312 and/or the base structure 314, to provide OIS-Z movement (e.g., movement that shifts an image projected on the image sensor 306 in one or more directions parallel to the Z-axis). In some embodiments, each of the shared OIS magnets 326 may have respective longest dimensions that are substantially parallel to respective longest dimensions of the OIS-Z coils 332. In some embodiments, the respective longest dimensions of the shared OIS magnets 326 and the OIS-Z coils 332 may be substantially parallel to a longest dimension of the system. Furthermore, the respective longest dimensions of the shared OIS magnets 326 and the OIS-Z coils 332 may be substantially orthogonal to the respective longest dimensions of the AF magnet 322 and the AF coil 324 in some embodiments. According to various embodiments, the OIS-Z coils 332 may be oriented such that directions of current flow through the OIS-Z coils 332 define a respective plane that is substantially orthogonal to a surface of the base structure 316.

In various embodiments, the base structure 314 may include a first portion 334 and a second portion 336. The first portion 334 may be located below the prism 304 and the lens group 302. Furthermore, the first portion 334 may define a first plane that is parallel to the optical axis defined by the lens group 302. In some embodiments, the second portion 336 may define a second plane that is orthogonal to the optical axis. In some examples, the second portion 336 may extend upwards (e.g., in the Z-axis direction) from the first portion 334 to form an L-shaped base structure 314. According to some embodiments, the first portion 334 and the second portion 336 may be formed together as a single component. In other embodiments, the base structure 314 may be formed from multiple components. As a non-limiting example, the first portion 334 and the second portion 336 may be formed individually and coupled together to form the base structure 314.

According to some embodiments, the first portion 334 of the base structure 314 may define a recess 338 for receiving at least a portion of the lens carrier 310, at least a portion of the lens barrel 308, and/or at least a portion of the lens group 302. The recess 338 may enable the lens group 302 to be located lower along the Z-axis direction than it would be without the recess 338, thereby enabling a reduction in the Z-axis dimension of at least the portion of the system that includes the lens group 302.

In some embodiments, the second portion 336 of the base structure 314 may define a window 340 that allows light to pass through the second portion 336 and to the image sensor 306. For example, the image sensor 306 may be attached to a substrate 342, and the substrate may be attached to the second portion 336 such that at least a portion of the image sensor receives light that passes through the window 340.

In some embodiments, the camera 300 may include one or more enclosures that cover at least a portion of the camera 300 (e.g., internal camera components). For example, the camera 300 may include an inner can 344 and/or an outer can 346 (not shown in FIG. 4). In some examples, the inner can 344 may cover at least a portion of the actuator module. In a non-limiting example, the inner can 344 may be shaped to fit over the magnet holder 312 without covering uppermost surfaces of the prism 304 or the lens barrel 308 (and/or the lens carrier 310). The outer can 346 may cover the inner can 344 and the lens barrel 308 (and/or the lens carrier 310) without covering uppermost surfaces of the prism 304.

In some embodiments, the camera 300 may include a stiffener 348 configured to be attached, or otherwise coupled, to the image sensor 306, the substrate 342, and/or the second portion 336 of the base structure 314. The stiffener 348 may provide structural support to the substrate 342 and/or the second portion 336 of the base structure 314. In some embodiments, the stiffener 348 may include a base portion 350 and one or more tab portions 352 that extend from the base portion 350 at a non-zero angle relative to the base portion 350. For example, the tab portion(s) 352 may extend orthogonal to base portion 350. According to some examples, the stiffener 348 may be formed by folding portions of a sheet of metal (or other suitable material) to form the tab portion(s) 352. That is, the base portion 350 and the tab portion(s) 352 may be formed of a same sheet of metal in some embodiments. In other embodiments, the base portion 350 and the tab portion(s) 352 may be formed separately and attached to form the stiffener 348. As indicated in FIG. 3, the stiffener 348 may include three tab portions 352 in some embodiments. In other embodiments, however, the stiffener 348 may include fewer or more tab portion(s) 352. The stiffener may be configured to enclose a portion of the camera 300 that is proximate the image sensor 306 and that is not covered by the outer can 346 and/or the first portion 334 of the base structure 314. In various embodiments, the base portion 350 may define a plane that is orthogonal to the optical axis defined by the lens group 302 and/or that is parallel to the image sensor 306.

In some examples, the camera 300 may include a prism holder 354 that holds the prism 304. The prism holder 354 may enclose one or more sides of the prism 304. In various embodiments, the prism holder 354 may not enclose at least a portion of the object side of the prism 304, so as to allow light to enter the prism 304. The prism 304 may be attached to one or more fixed (or static) structures of the camera 300 via the prism holder 354. For example, the prism holder 354 may be attached to the outer can 346 in some cases.

In some embodiments, the camera 300 may include a filter 402 (e.g., an infrared filter) (not shown in FIG. 3). The filter 402 may be coupled to the substrate, e.g., as indicated in FIG. 4. For instance, the filter 402 may be located between the lens group 302 and the image sensor 306 such that light passes through the filter 402 before reaching the image sensor 306.

Figure 5:
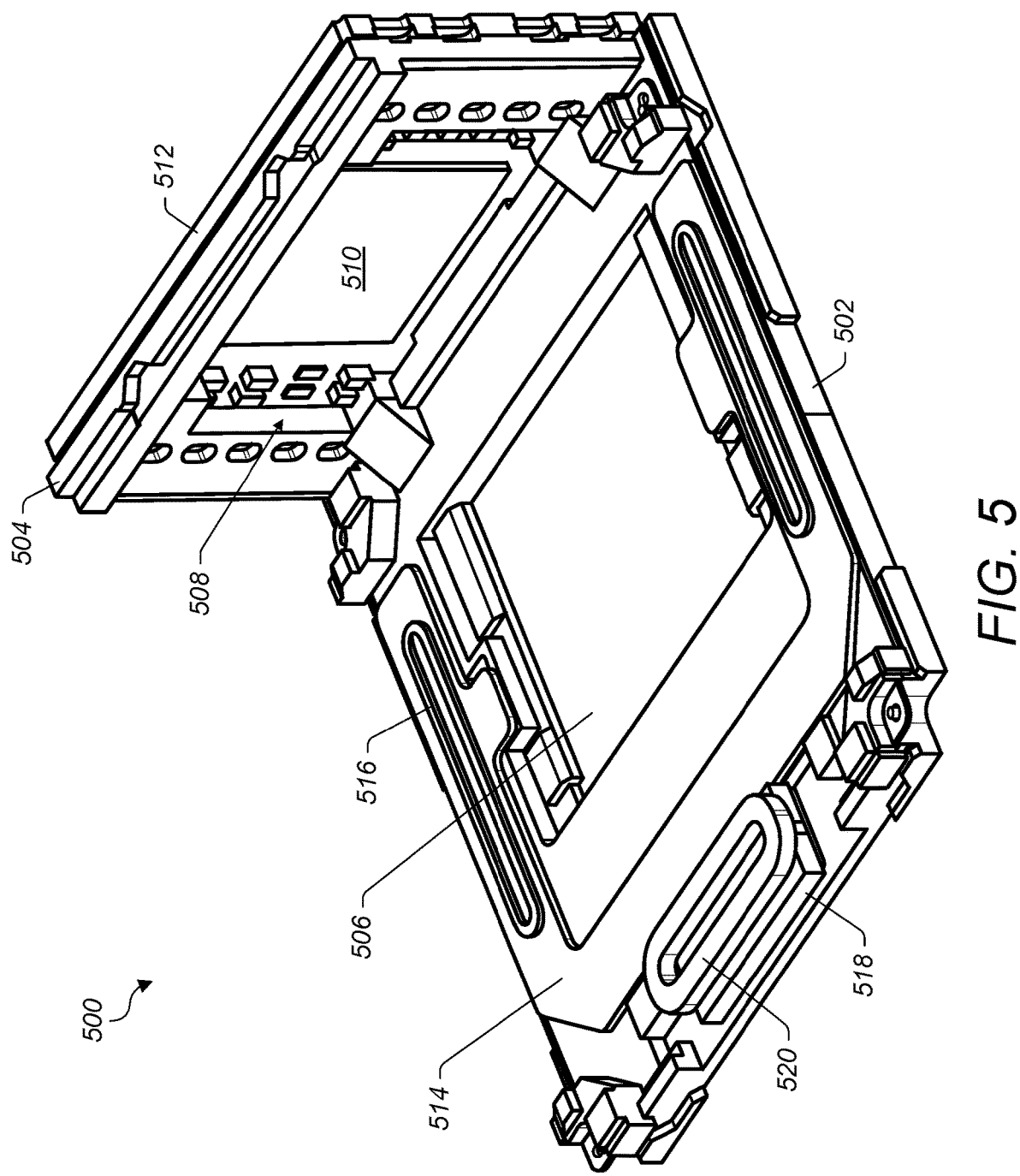
FIG. 5 illustrates a perspective view of an example base structure of a camera having a folded optics arrangement, in accordance with some embodiments.

FIG. 5 illustrates a perspective view of an example base structure 500 of a camera having a folded optics arrangement. The base structure 500 may include components that are similar to, or the same as, components of the base structure 314 described above with reference to FIGS. 3 and 4.

According to various embodiments, the base structure 500 may include a first portion 502 and a second portion 504. The first portion 502 may be located below a prism and a lens group (e.g., the prism 304 and the lens group 302 in FIGS. 3 and 4). Furthermore, the first portion 504 may define a first plane that is parallel to an optical axis defined by the lens group. In some embodiments, the second portion 504 may define a second plane that is orthogonal to the optical axis. In some examples, the second portion 504 may extend upwards (e.g., in the Z-axis direction) from the first portion 502 to form an L-shaped base structure 500. According to some embodiments, the first portion 502 and the second portion 504 may be formed together as a single component. In other embodiments, the base structure 500 may be formed from multiple components. As a non-limiting example, the first portion 502 and the second portion 504 may be formed separately and coupled together to form the base structure 500.

According to some embodiments, the first portion 502 of the base structure 500 may define a recess 506 for receiving at least a portion of a lens carrier (e.g., the lens carrier 310 in FIGS. 3 and 4), at least a portion of a (e.g., the lens barrel 308 in FIGS. 3 and 4), and/or at least a portion of a (e.g., the lens group 302 in FIGS. 3 and 4). The recess 506 may enable the lens group to be located lower along the Z-axis direction than it would be without the recess 506, thereby enabling a reduction in the Z-axis dimension of at least a portion of a camera system (e.g., a portion that includes the lens group).

In some embodiments, the second portion 504 of the base structure 500 may define a window 508 that allows light to pass through the second portion 504 and to an image sensor 510. For example, the image sensor 510 may be attached to a substrate 512, and the substrate 512 may be attached to the second portion 504 such that at least a portion of the image sensor 510 receives light that passes through the window 508.

As indicated in FIG. 5, one or more components may also be coupled to the first portion 502 of the base structure 500. For example, as similarly discussed above with reference to FIGS. 3 and 4, a flex circuit 514, one or more coils 516 (e.g., OIS-Y coils), and one or more magnets 518 (e.g., an AF magnet) may be coupled to the first portion 502 of the base structure 500. In some embodiments, the flex circuit 514 and the magnet 518 may be mounted on a top surface of the first portion 502, e.g., as indicated in FIG. 5. The coil(s) 516 may be mounted on a top surface of the flex circuit 514. FIG. 5 further shows a coil 520 (e.g., an AF coil) disposed proximate the magnet 518. The coil 520 may be attached to a magnet holder (e.g., the magnet holder 312 in FIGS. 3 and 4) (not shown in FIG. 5), and may be configured to magnetically interact with magnet 518, e.g., to enable AF movement of the a lens group disposed above (and/or at least partially within) the recess 506 defined by the first portion 502 of the base structure 500.

In some embodiments, the base structure 500 may include electrical signal traces (not shown) that convey electrical signals (e.g., power and/or control signals) between the second portion 504 and the first portion 502. As a non-limiting example, the electrical signal traces may be conveyed from the image sensor 510 to the flex circuit 514 via the substrate 512, the second portion 504, and/or the first portion 502.

Figure 6:
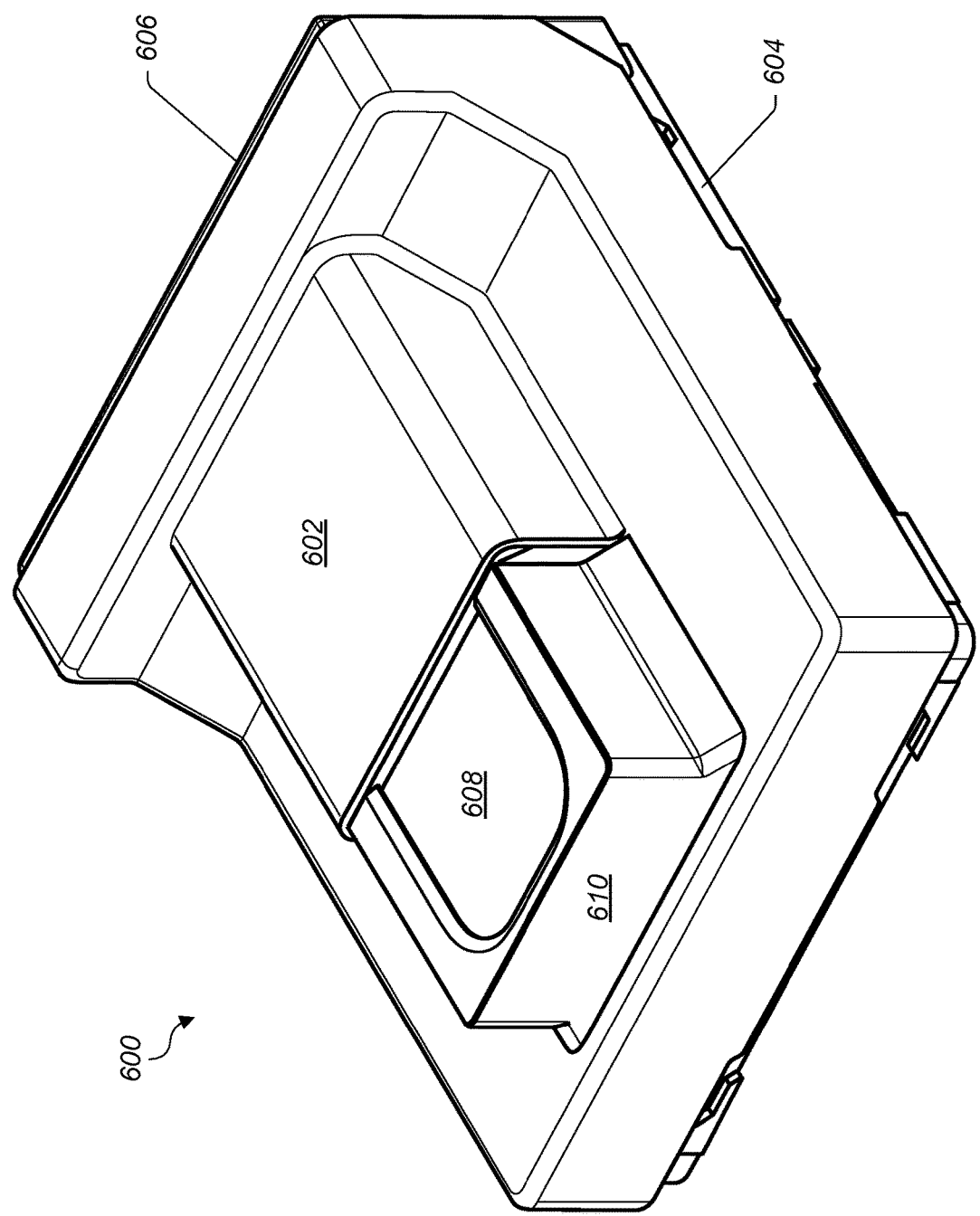
FIG. 6 illustrates a perspective view of an example camera having a folded optics arrangement, with an outer can covering at least a portion of the internal components of the camera, in accordance with some embodiments.

FIG. 6 illustrates a perspective view of an example camera 600 having a folded optics arrangement, with an outer can 602 (e.g., a shield can) covering at least a portion of the internal components of the camera 600. The camera 600 may include components that are similar to, or the same as, components of the camera 300 described above with reference to FIGS. 3 and 4. Furthermore, the outer can 602 may be similar to, or the same as, the outer can 346 described above with reference to FIG. 3.

In some embodiments, the outer can 602 may configured to partly enclose an upper portion of the camera 600. Furthermore, the outer can 600 may be configured to enclose one or more side portions of the camera 600. For example, as indicated in FIG. 6, the outer can 600 may enclose three side portions of the camera 600. The camera 600 may include a base structure 604 that encloses a bottom portion of the camera 600, and a stiffener 606 that encloses another side portion of the camera (e.g., a side portion that is not enclosed by the outer can 602 or the base structure 604.

As shown in FIG. 6, the camera 600 may include a prism 608 attached to a prism holder 610. The outer can 602 may be formed such that it does not enclose (or cover) an upper portion of the prism 608 and/or an upper portion of the prism holder 610. As such, an object side of the prism 608 may be exposed such that light is capable of entering the prism 608 via its object side.

Figure 7A:
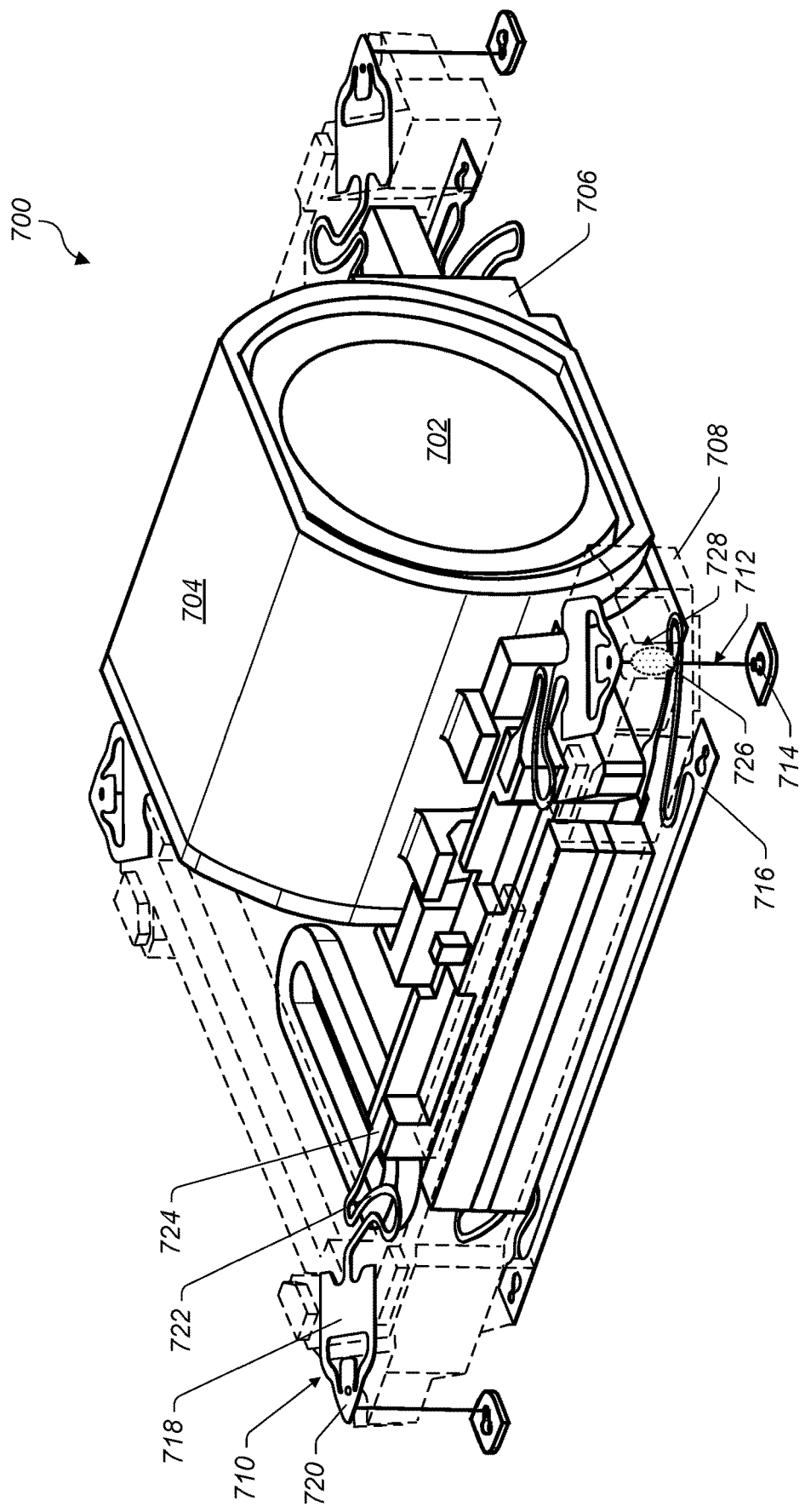
Figure 7C:
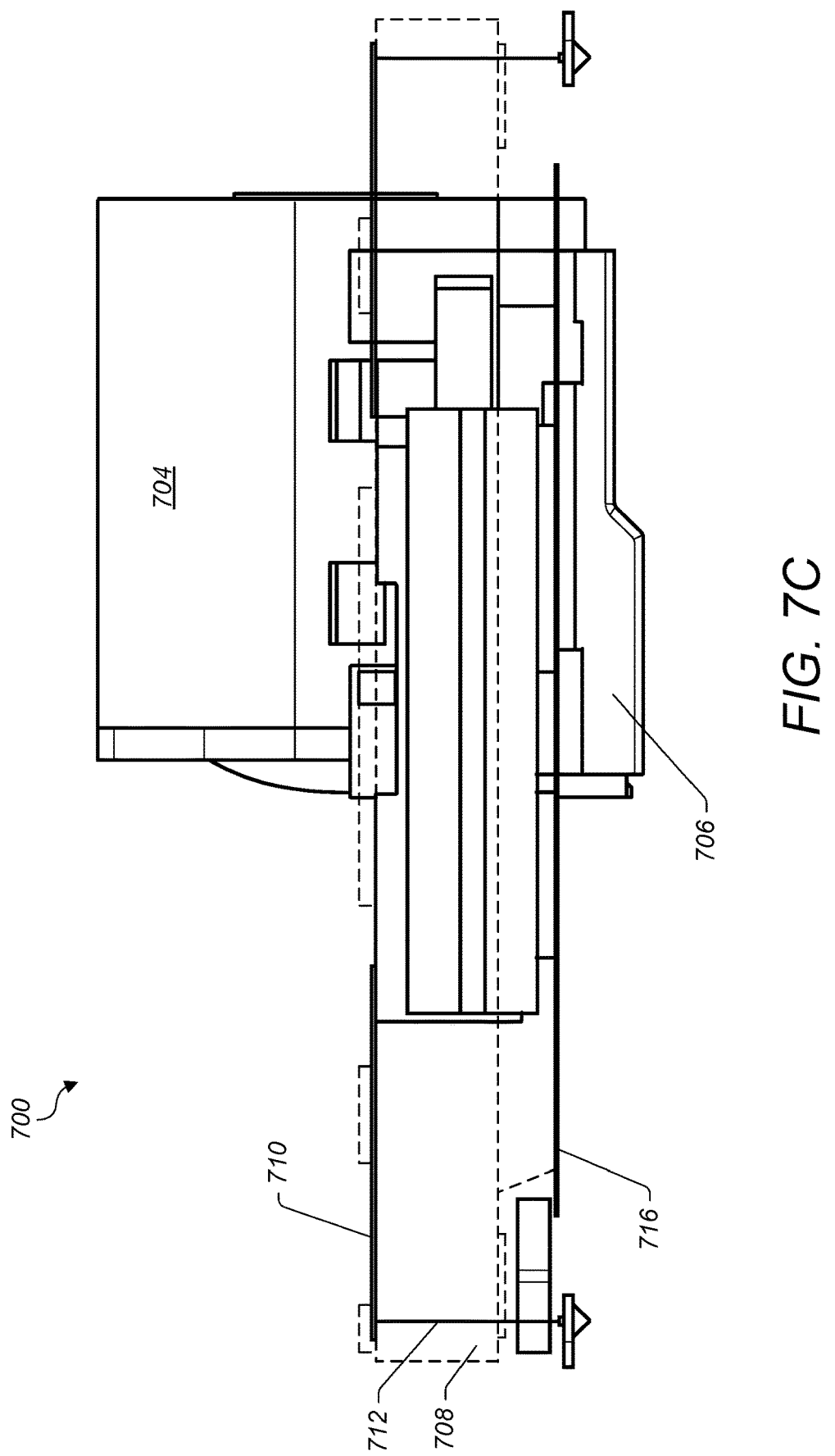

FIGS. 7A-7C each illustrate a respective view of an example suspension arrangement 700 for a camera having a folded optics arrangement. FIG. 7A shows a perspective view of the suspension arrangement 700. FIG. 7B shows a top view of the suspension arrangement 700. FIG. 7C shows a side view of the suspension arrangement 700.

In some embodiments, the camera may include a lens group 702, e.g., between a prism and an image sensor as discussed above with reference to at least FIGS. 1, 3, and 4. The lens group 702 may include one or more lens elements disposed within a lens barrel 704. Furthermore, in various embodiments, the camera may include a lens carrier 706 configured to hold the lens barrel 704 and/or the lens group 702. For instance, the lens carrier 706 may at least partially surround the lens barrel 704 in some embodiments.

In various embodiments, the lens carrier 706 (and/or lens barrel 704) may be suspended from a magnet holder 708 via the suspension arrangement 700. Additionally, or alternatively, the magnet holder 708 may be suspended from a fixed structure (not shown) via the suspension arrangement 700. The suspension arrangement 700 may allow the lens carrier 706 to move relative to the magnet holder 708. Furthermore, the suspension arrangement 700 may allow the lens carrier 706 to move together with the magnet holder 708 relative to the fixed structure.

Figure 9A:
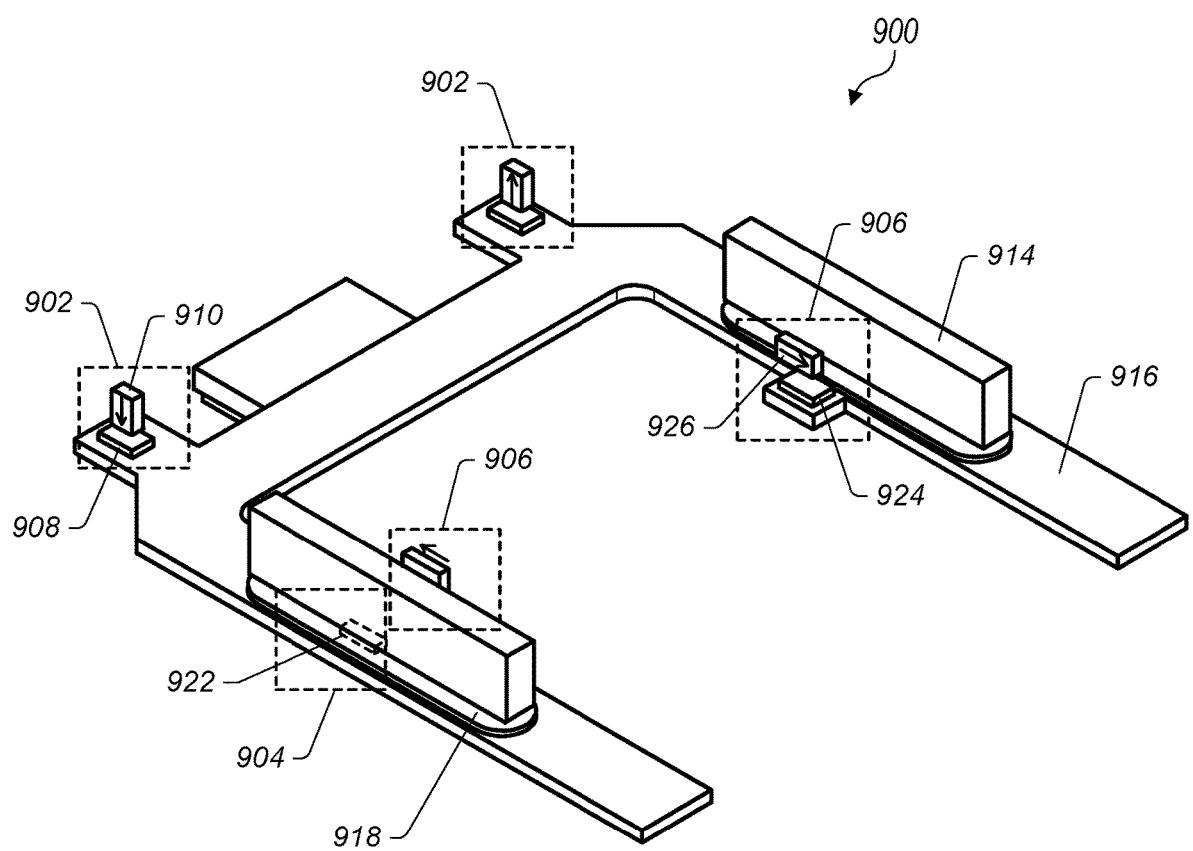
FIGS. 9A-9C each illustrate a respective view of another example position sensor arrangement for a camera having a folded optics arrangement, in accordance with some embodiments.
Figure 9B:
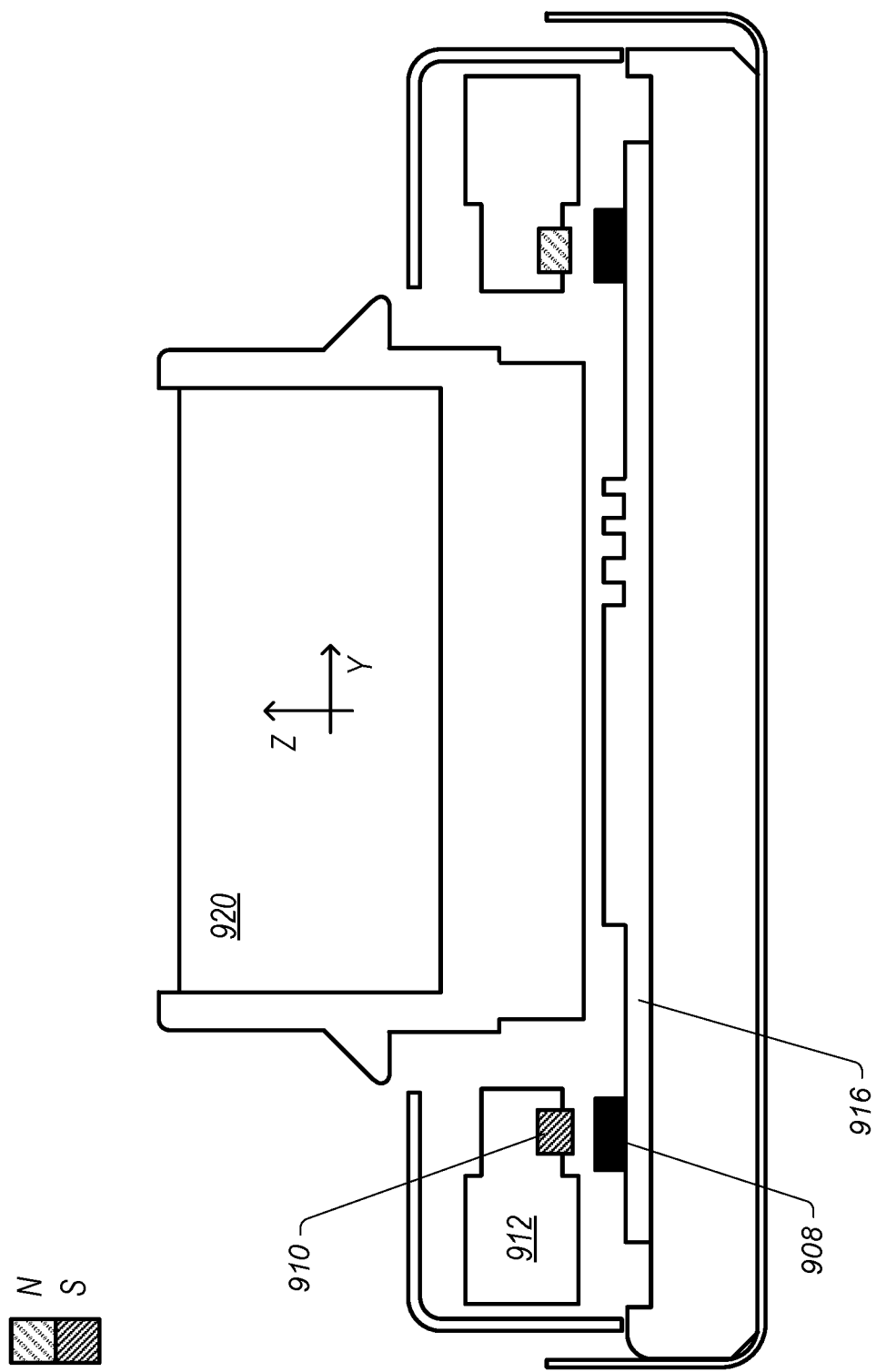

According to some embodiments, the suspension arrangement 700 may include a set of one or more top springs 710 attached to respective top corner portions of the magnet holder 708 and the lens carrier 706. For instance, FIGS. 9A-9B show four top springs 710, each of which includes a respective first end that is attached to a respective corner portion of the magnet holder 708, and a second end that is attached to a corresponding corner portion of the lens carrier 706 (e.g., a corner portion of the lens carrier 706 that is located proximate the respective corner portion of the magnet holder 708). Furthermore, a respective suspension wire 712 may extend downward from each of the top springs 710. A bottom end portion 714 of the respective suspension wire 710 may be attached to a fixed (or static) structure, e.g., a fixed base structure of the camera. In various embodiments, any number of the top springs 710 may be connected such that they form a single piece of material having individual portions that can independently flex. Reducing the number of individual pieces in this manner may be desirable from a manufacturing standpoint in some cases.

According to some embodiments, the suspension arrangement 700 may include a set of one or more bottom springs 716 attached to respective bottom corner portions of the magnet holder 708 and the lens carrier 706. The bottom springs 716 may include a first end that is attached to a respective corner portion of the magnet holder 708, and a second end that is attached to a corresponding corner portion of the lens carrier 706. In some embodiments, a respective suspension wire (not shown) may extend upward from each of the bottom springs 716. A top end portion of the respective suspension wire may be attached to a fixed structure of the camera.

In some embodiments one or more suspension elements used for suspending the magnet holder 708 may be decoupled from one or more suspension elements used for suspending the lens carrier 706. For example, as indicated in FIG. 7A, the top spring 710 may have a fixed portion 718 that is fixed relative to the magnet holder 708. The top spring 710 may have a first portion 720 that can flex relative to the magnet holder 708 and that is connected to the suspension wire 712 for suspending the magnet holder 708. Furthermore, the top spring 710 may have a second portion 722 that can independently flex relative to the magnet holder 708 and that is connected to the lens carrier 706 (e.g., at fixed portion 724 that is fixed relative to the lens carrier 706) for suspending the lens carrier 706. In some embodiments, the first portion 720 and the second portion 722 may be made from separate pieces of material.

In some embodiments, one or more of the top springs 710 and/or one or more of the bottom springs 716 may not be positioned at corners of the magnet holder 708 and/or the lens carrier 706. For example, one or more of the springs may be positioned along sides of the magnet holder 708 and/or the lens carrier 706. Furthermore, the top springs 710 and/or the bottom springs 716 may have more (or fewer) than four springs. In some embodiments, the top springs 710 may have the same number of springs as the bottom springs 716. In other embodiments, the top springs 710 may have a different number of springs than the bottom springs 716.

In some embodiments, one or more lens elements of the lens group 702 may define an optical axis that is substantially parallel to a plane defined by the set of top springs 710. Additionally, or alternatively, the optical axis may be substantially parallel to a plane defined by the set of bottom springs 716. Furthermore, a plane defined by the set of top springs 710 may be substantially parallel to a plane defined by the set of bottom springs 716. In some instances, the suspension wires 712 may extend in directions that are substantially orthogonal to the optical axis, a plane defined by the set of top springs 710, and/or a plane defined by the set of bottom springs 716.

In various embodiments, the suspension arrangement 700 may provide compliance and/or stiffness for controlled movement of the lens carrier 706 and/or the magnet holder 708. According to some examples, the suspension wires 712 may flex to allow controlled AF movement (e.g., along the X-axis) and/or OIS-Y movement (e.g., along the Y-axis) of the magnet holder 708 together with the lens carrier 706. In some instances, e.g., during such AF and/or OIS-Y movement, the set of top springs 710 and/or the set of bottom springs 716 may not flex (or may flex substantially less than the suspension wires 712). In various embodiments, the suspension wires 712 may provide compliance for such AF and/or OIS-Y movement in a controlled manner, and may provide sufficient stiffness to resist X-Y plane movement of the lens carrier (and the lens group 102) during OIS-Z movement. According to some examples, the set of top springs 710 and/or the set of bottom springs 716 may flex to allow controlled OIS-Z movement (e.g., in the Z-axis direction) of the lens carrier 706 relative to the magnet holder 708. In some instances, e.g., during such OIS-Z movement, the suspension wires 712 may not flex (or may flex substantially less than the set of top springs 710 and/or the set of bottom springs 716). In various embodiments, the top springs 710 and/or the bottom springs 716 may provide compliance for such OIS-Z movement in a controlled manner, and may provide sufficient stiffness to resist Z-axis movement of the lens carrier 706 (and the lens group 702) during OIS-Y and/or AF movement.

In some embodiments, the camera and/or the suspension arrangement 700 may include a damper that dampens movement of one or more of the suspension wires 712. For instance, the suspension wires 712 may be at least partially disposed within a viscoelastic material 726 (e.g., a viscoelastic gel). In some examples, the magnet holder 708 may define one or more pockets 728 within which the viscoelastic material 726 may be disposed. In some instances, the viscoelastic material 726 may be injected into a pocket 728 through a hole in a base structure (not shown) that at least partially surrounds the magnet holder 708. For example, an insertion needle (not shown) may be inserted through the hole in the base structure to access the pocket and inject the viscoelastic material 726 into the pocket 728. In some embodiments, protrusions may extend from corner portions of the magnet holder 708 to form the pockets 728. While FIG. 7A shows pockets 728 formed from the magnet holder 708, it should be understood that the viscoelastic material 726 may be disposed within pockets formed differently, e.g., via pockets formed of protrusions from a structure other than the magnet holder 708, pockets formed via a combination of the magnet holder 708 and one or more other structures, etc. The viscoelastic material 726 may be located along any portion(s) of the length of a suspension wire 712. In some embodiments, the viscoelastic material 726 may be located along a central portion of the length of a suspension wire 712.

In various embodiments, the suspension arrangement 700 may be used to carry signals (e.g., power and/or control signals) from the fixed structure of the camera to the magnet holder 708 and/or the lens carrier 706. For example, suspension wires 712 may carry the signals from the fixed structure to top springs 710. The top springs 710 may carry the signals (e.g., via first portion 720 and fixed portion 718) from the suspension wires 712 to the magnet holder 708, and the signals may be routed to one or more coils attached to the magnet holder 708. Additionally, or alternatively, the top springs 710 may carry the signals (e.g., via second portion 722 and fixed portion 724) from the suspension wires 712 to the lens carrier 706, and the signals may be routed to one or more coils attached to the lens carrier 706. Various portions of the suspension arrangement, the magnet holder 708, and/or the lens carrier 706 may be formed of electrically conductive material and/or may include electrical traces for carrying/routing the signals, e.g., from the fixed structure to the coils.

Figure 8A:
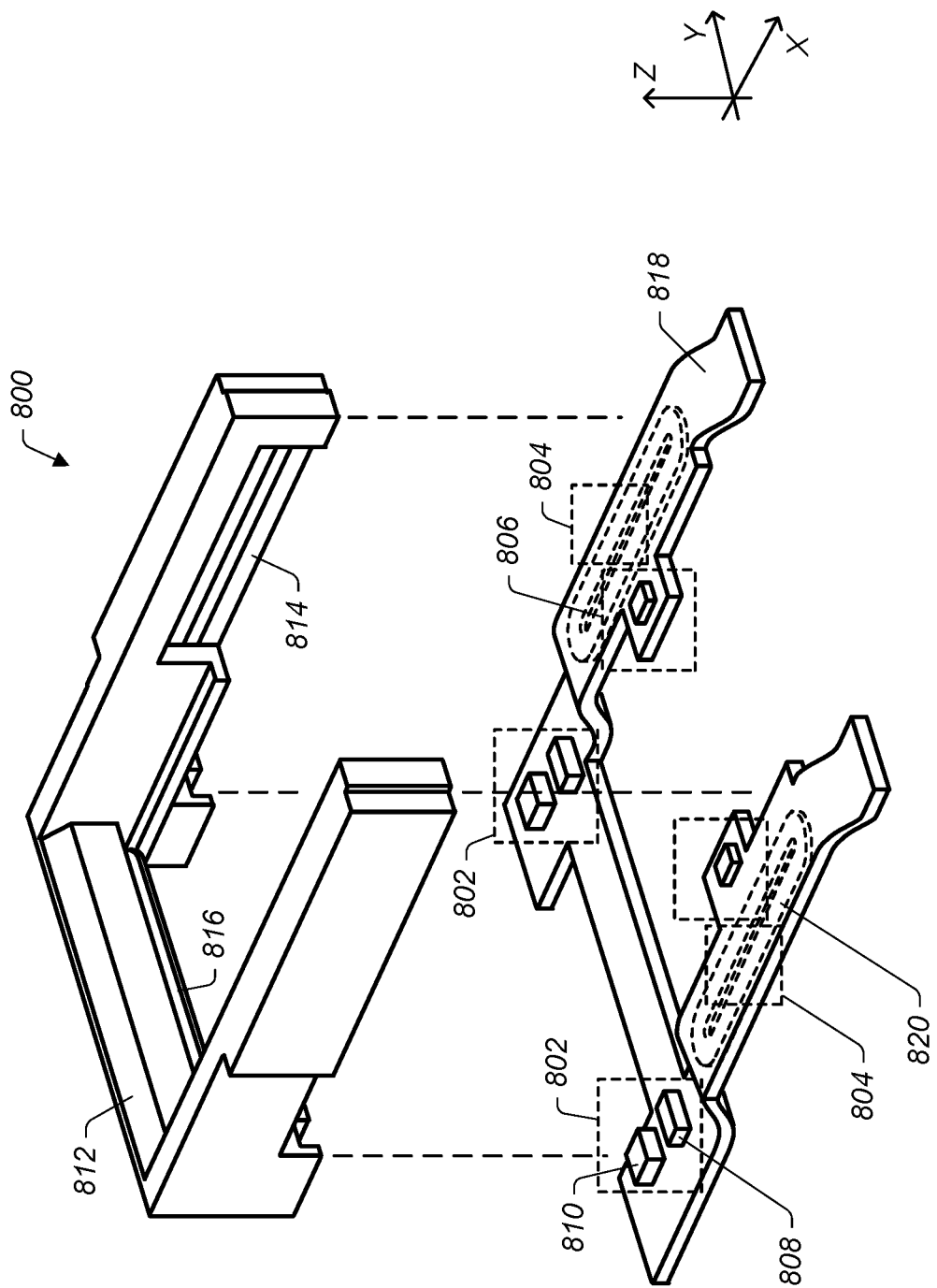
FIGS. 8A-8E each illustrates a respective view of an example position sensor arrangement 800 for a camera having a folded optics arrangement, in accordance with some embodiments.
Figure 8B:
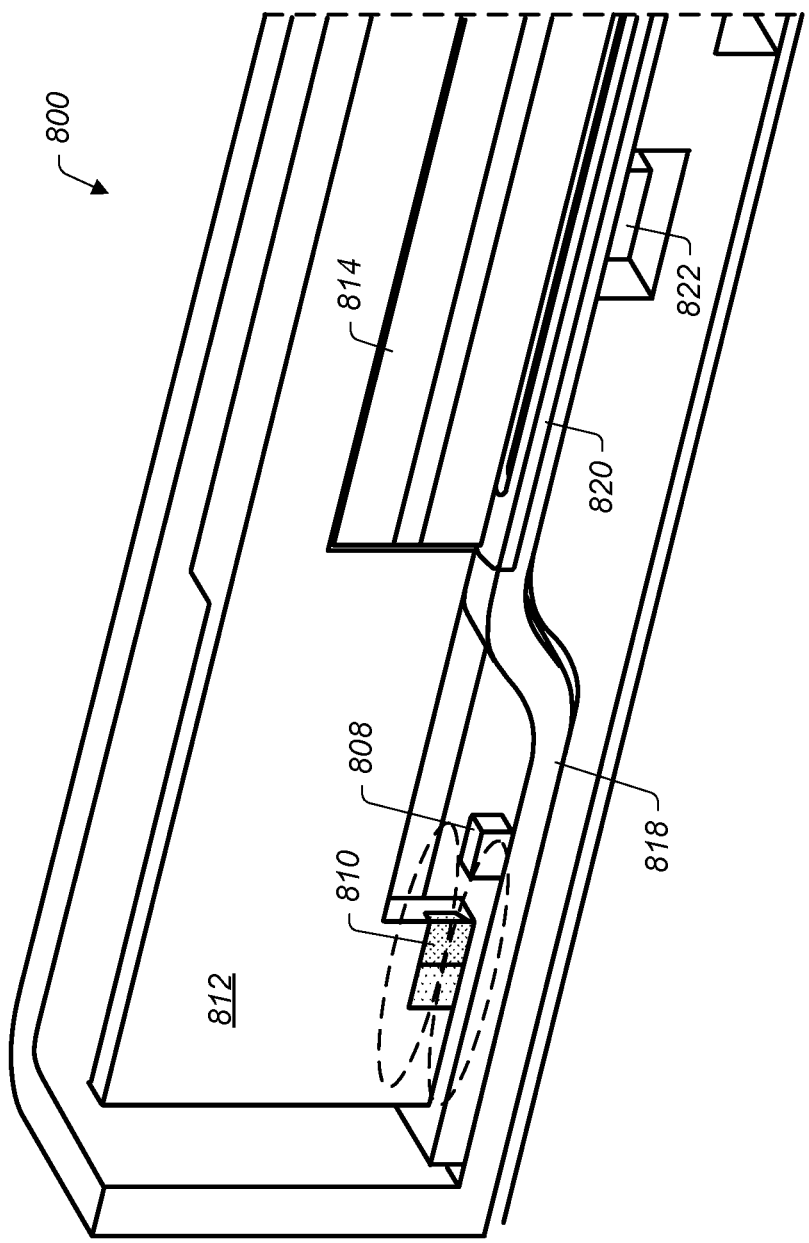
Figure 8C:
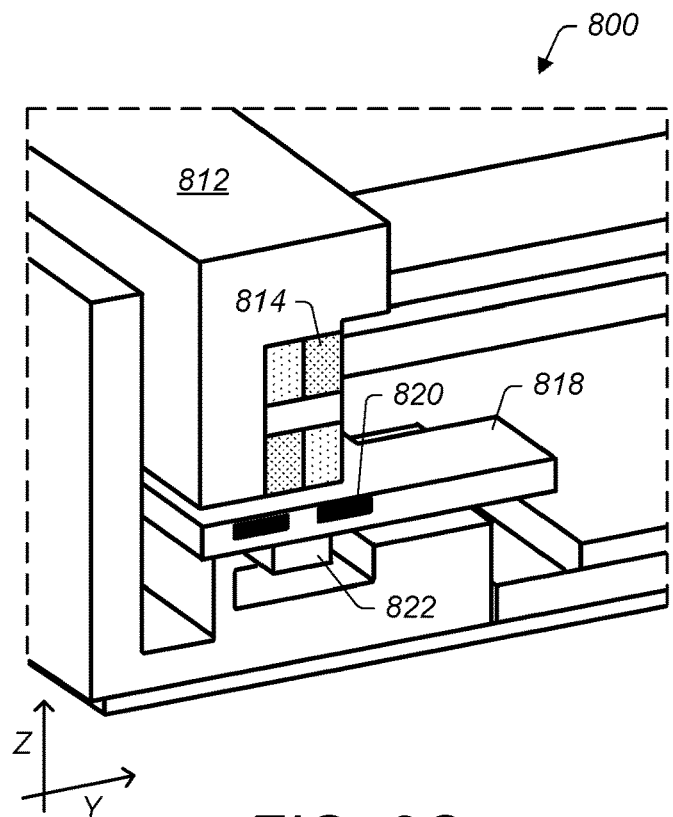
Figure 8D:
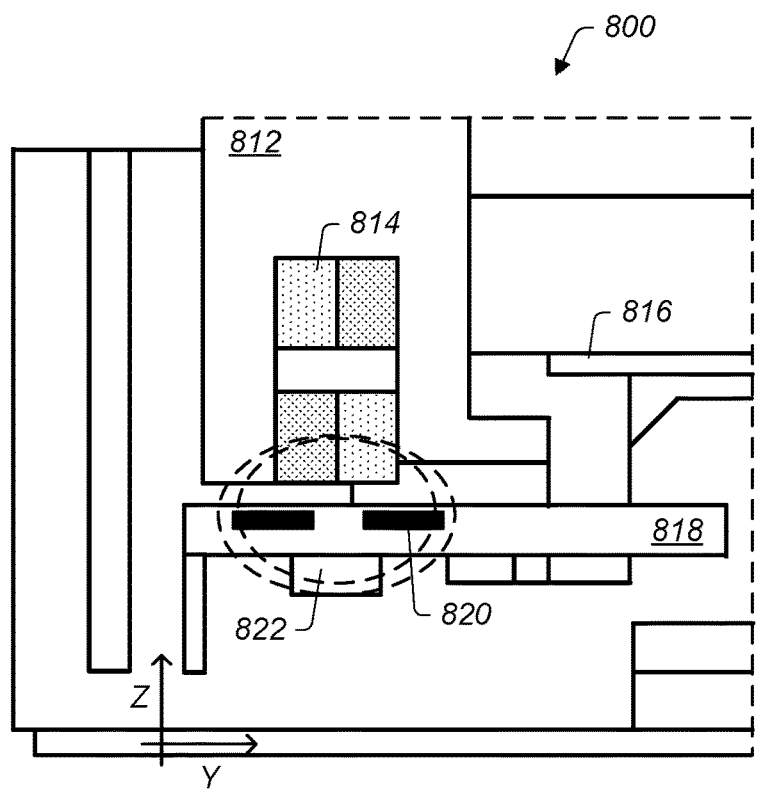
Figure 8E:
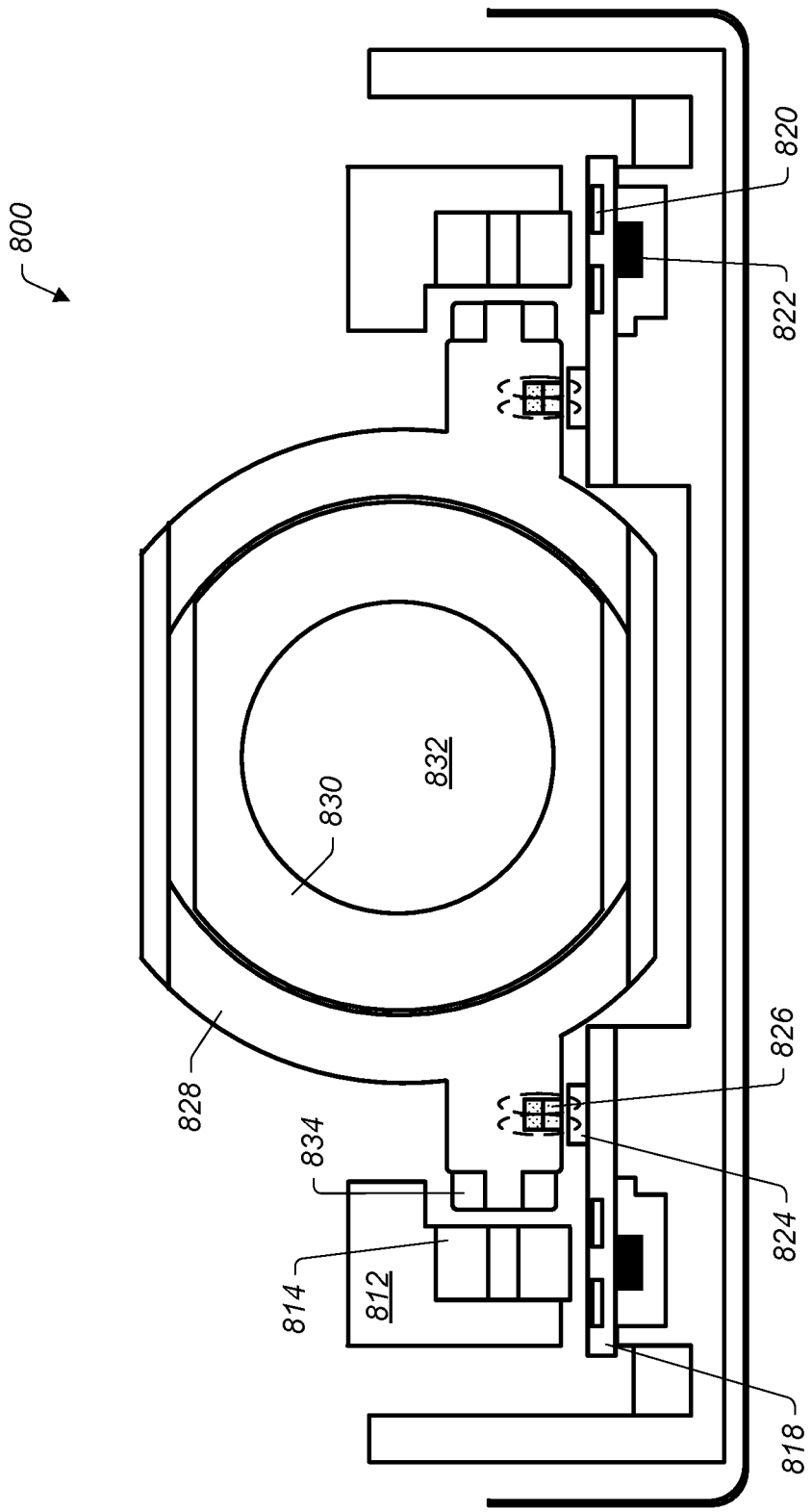

FIGS. 8A-8E each illustrates a respective view of an example position sensor arrangement 800 for a camera having a folded optics arrangement. FIG. 8A shows a perspective view of the position sensor arrangement 800. The position sensor arrangement 800 may include position sensors for position sensing with respect to AF movement, OIS-Y movement, and OIS-Z movement. FIG. 8B shows a detail view that focuses on position sensing with respect to AF movement. FIGS. 8C-8D each shows a respective detail view that focuses on position sensing with respect to OIS-Y movement. FIG. 8E shows a detail view that focuses on position sensing with respect to OIS-Z movement.

According to various embodiments, the position sensor arrangement 800 may include an AF movement position sensor arrangement 802, an OIS-Y movement position sensor arrangement 804, and/or an OIS-Z movement position sensor arrangement 806.

In some embodiments, the AF movement position sensor arrangement 802 may include one or more AF position sensors 808 and one or more corresponding AF probe magnets 810. The AF position sensors 808 may be magnetic field sensors (e.g., Hall sensors, tunneling magnetoresistance (TMR) sensors, giant magnetoresistance (GMR) sensors, etc.) in various embodiments. An AF position sensor 808 may be disposed proximate a corresponding AF probe magnet 810 such that the AF position sensor 808 is capable of sensing one or more magnetic field components of the corresponding AF probe magnet 810, e.g., as the AF probe magnet 810 moves relative to the AF position sensor 808.

In some examples, the AF probe magnet 810 may be attached to a magnet holder 812. The magnet holder 812 may be configured to hold one or more magnets (e.g., shared OIS magnets 814). Furthermore, the magnet holder 812 may be configured to hold one or more coils (e.g., AF coil 816).

In some embodiments, the AF position sensor 808 may be attached to a fixed (or static) structure of the camera. For instance, the fixed structure may be a flex circuit 818 that is common to (or shared by) some or all of the position sensors of the position sensor arrangement 800. That is, some or all of the position sensors of the position sensor arrangement 800 may be attached to the flex circuit 818. Additionally, or alternatively, the flex circuit 818 may include one or more coils (e.g., OIS-Y coils 820).

In various embodiments, the AF movement position sensor arrangement 802 may include two AF position sensors 808 and two corresponding AF probe magnets 810. A first AF position sensor 808 and a first corresponding AF probe magnet 810 may form a first pair. A second AF position sensor 808 and a second corresponding AF probe magnet 810 may form a second pair that is opposite the first pair with respect to the system X-axis, e.g., as indicated in FIG. 8A. By having two such pairs, rotation about the system Z-axis due to system X-axis displacement may be cancelled out in some embodiments.

In some embodiments, the OIS-Y movement position sensor arrangement 804 may include one or more OIS-Y position sensors 822. The OIS-Y position sensors 822 may be magnetic field sensors (e.g., Hall sensors, TMR sensors, GMR sensors, etc.) in various embodiments. An OIS-Y position sensor 822 may be disposed proximate a corresponding shared OIS magnet 814 (e.g., a dual-pole magnet) such that the OIS-Y position sensor 822 is capable of sensing one or more magnetic field components of the corresponding shared OIS magnet 814, e.g., as the shared OIS magnet 814 moves relative to the OIS-Y position sensor 822.

In some cases, the OIS-Y position sensor 822 may be attached to a fixed (or static) structure of the camera. For instance, the fixed structure may be the flex circuit 818 that is common to (or shared by) some or all of the position sensors of the position sensor arrangement 800. In some embodiments, the OIS-Y position sensor 822 may be attached to the flex circuit 818 below the shared OIS magnet 814 and/or below the OIS-Y coil 820, e.g., as indicated in FIGS. 8C-8D.

In various embodiments, the OIS-Y movement position sensor arrangement 804 may include two OIS-Y position sensors 822 and two corresponding shared OIS magnets 814. A first OIS-Y position sensor 822 and a first corresponding shared OIS magnet 814 may form a first pair. A second OIS-Y position sensor 822 and a second corresponding shared OIS magnet 814 may form a second pair that is opposite the first pair with respect to the system X-axis, e.g., as indicated in FIG. 8A. By having two such pairs, rotation about the system Z-axis due to system Y-axis displacement may be cancelled out in some embodiments.

In some embodiments, the OIS-Z movement position sensor arrangement 806 may include one or more OIS-Z position sensors 824 and one or more corresponding OIS-Z probe magnets 826. The OIS-Z position sensors 824 may be magnetic field sensors (e.g., Hall sensors, TMR sensors, GMR sensors, etc.) in various embodiments. An OIS-Z position sensor 824 may be disposed proximate a corresponding OIS-Z probe magnet 826 such that the OIS-Z position sensor 824 is capable of sensing one or more magnetic field components of the corresponding OIS-Z probe magnet 826, e.g., as the OIS-Z probe magnet 826 moves relative to the OIS-Z position sensor 824.

In some examples, the OIS-Z probe magnet 826 may be attached to a lens carrier 828 (or a lens barrel). The lens carrier 828 may be configured to hold a lens barrel 830 and/or a lens group 832 (e.g., a lens group having one or more lens elements disposed within the lens barrel 830). Furthermore, the lens carrier 828 may be configured to hold one or more coils (e.g., OIS-Z coils 834). In some embodiments, the OIS-Z position sensor 824 may be attached to a fixed (or static) structure of the camera. For instance, the fixed structure may be the flex circuit 818 that is common to (or shared by) some or all of the position sensors of the position sensor arrangement 800.

In various embodiments, the OIS-Z movement position sensor arrangement 806 may include two OIS-Z position sensors 824 and two corresponding OIS-Z probe magnets 826. A first OIS-Z position sensor 824 and a first corresponding OIS-Z probe magnet 826 may form a first pair. A second OIS-Z position sensor 824 and a second corresponding OIS-Z probe magnet 826 may form a second pair that is opposite the first pair with respect to the system X-axis, e.g., as indicated in FIGS. 8A and 8E. By having two such pairs, rotation about the system Z-axis (due to system Z-axis displacement) and/or external field effects may be cancelled out in some embodiments.

In some embodiments, the flex circuit 818 may be coupled to (e.g., in electrical contact with) an image sensor package (not shown). Additionally, or alternatively, the image sensor package may be coupled to (e.g., in electrical contact with) another flex circuit.

Figure 9C:
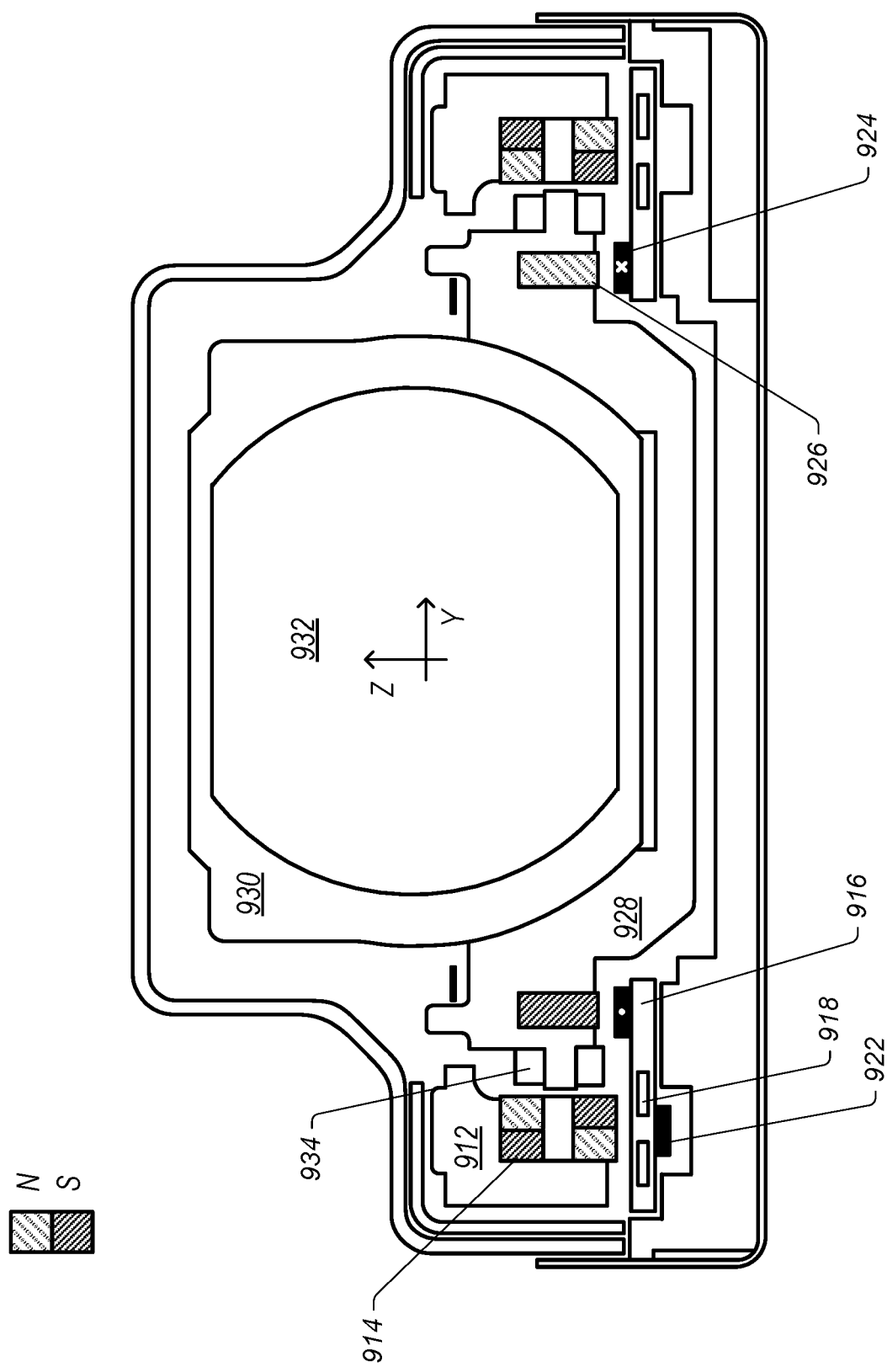

FIGS. 9A-9C each illustrate a respective view of another example position sensor arrangement 900, e.g., for a camera having a folded optics arrangement. FIG. 9A shows a perspective view of the position sensor arrangement 900. The position sensor arrangement 900 may include position sensors for position sensing with respect to AF movement, OIS-Z movement, and OIS-Y movement. FIG. 9B shows a cross-sectional view that focuses on position sensing with respect to AF movement. FIG. 9C shows a cross-sectional view that focuses on position sensing with respect to OIS-Z and OIS-Y movement.

According to various embodiments, the position sensor arrangement 900 may include an AF movement position sensor arrangement 902, an OIS-Y movement position sensor arrangement 904, and/or an OIS-Z movement position sensor arrangement 906.

In some embodiments, the AF movement position sensor arrangement 902 may include one or more AF position sensors 908 and one or more corresponding AF probe magnets 910, e.g., as shown in FIGS. 9A and 9B. The AF position sensors 908 may be magnetic field sensors (e.g., Hall sensors, tunneling magnetoresistance (TMR) sensors, giant magnetoresistance (GMR) sensors, etc.) in various embodiments. An AF position sensor 908 may be disposed proximate a corresponding AF probe magnet 910 such that the AF position sensor 908 is capable of sensing one or more magnetic field components of the corresponding AF probe magnet 910, e.g., as the AF probe magnet 910 moves (e.g., along the Z-axis) relative to the AF position sensor 908.

In some examples, the AF probe magnet 910 may be attached to a magnet holder 912. The magnet holder 912 may be configured to hold one or more magnets (e.g., shared OIS magnets 914 shown in FIGS. 9A and 9C). Furthermore, the magnet holder 912 may be configured to hold one or more coils, such as an AF coil (not shown). In some embodiments, the AF position sensor 908 may be attached to a fixed (or static) structure of the camera. For instance, the fixed structure may be a flex circuit 916 that is common to (or shared by) some or all of the position sensors of the position sensor arrangement 900. That is, some or all of the position sensors of the position sensor arrangement 900 may be attached to the flex circuit 916. Additionally, or alternatively, the flex circuit 916 may include one or more coils (e.g., OIS-Y coils 918).

In various embodiments, the AF movement position sensor arrangement 902 may include two AF position sensors 908 and two corresponding AF probe magnets 910. A first AF position sensor 908 and a first corresponding AF probe magnet 910 may form a first pair. A second AF position sensor 908 and a second corresponding AF probe magnet 910 may form a second pair that is opposite the first pair with respect to an X-Z plane that intersects one or more optical elements of the folded optics arrangement (e.g., prism 920). As indicated by the arrows on the AF probe magnets 910 in FIG. 9A (and by the hatching in FIG. 9B), the AF probe magnet 910 of the first pair may have a N-S polarity direction that is opposite that of the AF probe magnet 910 of the second pair. By having two such pairs, rotation about the system Z-axis due to system X-axis displacement may be cancelled out in some embodiments.

In some embodiments, the OIS-Y movement position sensor arrangement 904 may include one or more OIS-Y position sensors 922, e.g., as shown in FIGS. 9A and 9C. In a non-limiting example, the OIS-Y movement position sensor arrangement 904 may include a single OIS-Y position sensor 922. The OIS-Y position sensor 922 may be a magnetic field sensor (e.g., Hall sensors, TMR sensors, GMR sensors, etc.) in various embodiments. The OIS-Y position sensor 922 may be disposed proximate a shared OIS magnet 914 (e.g., a dual-pole magnet) such that the OIS-Y position sensor 922 is capable of sensing one or more magnetic field components of the corresponding shared OIS magnet 914, e.g., as the shared OIS magnet 914 moves (e.g., along the Y-axis) relative to the OIS-Y position sensor 922. In some embodiments, due to the magnitude of the magnetic field produced by the shared OIS magnet 914, the OIS-Y movement position sensor arrangement 904 may not require a separate probe magnet and/or more than one OIS-Y movement position sensors.

In some cases, the OIS-Y position sensor 922 may be attached to a fixed (or static) structure of the camera. For instance, the fixed structure may be the flex circuit 916 that is common to (or shared by) some or all of the position sensors of the position sensor arrangement 900. In some embodiments, the OIS-Y position sensor 922 may be attached to the flex circuit 916 below the shared OIS magnet 914 and/or below the OIS-Y coil 918, e.g., as indicated in FIGS. 9A and 9C.

In some embodiments, the OIS-Z movement position sensor arrangement 906 may include one or more OIS-Z position sensors 924 and one or more corresponding OIS-Z probe magnets 926. The OIS-Z position sensors 924 may be magnetic field sensors (e.g., Hall sensors, TMR sensors, GMR sensors, etc.) in various embodiments. An OIS-Z position sensor 924 may be disposed proximate a corresponding OIS-Z probe magnet 926 such that the OIS-Z position sensor 924 is capable of sensing one or more magnetic field components of the corresponding OIS-Z probe magnet 926, e.g., as the OIS-Z probe magnet 926 moves (e.g., along the Z-axis) relative to the OIS-Z position sensor 924.

In some examples, the OIS-Z probe magnet 926 may be attached to a lens carrier 928 (or a lens barrel). The lens carrier 928 may be configured to hold a lens barrel 930 and/or a lens group 932 (e.g., a lens group having one or more lens elements disposed within the lens barrel 930). Furthermore, the lens carrier 928 may be configured to hold one or more coils (e.g., OIS-Z coils 934 shown in FIG. 9C).

In some embodiments, the OIS-Z position sensor 924 may be attached to a fixed (or static) structure of the camera. For instance, the fixed structure may be the flex circuit 916 that is common to (or shared by) some or all of the position sensors of the position sensor arrangement 900.

In various embodiments, the OIS-Z movement position sensor arrangement 906 may include two OIS-Z position sensors 924 and two corresponding OIS-Z probe magnets 926. A first OIS-Z position sensor 924 and a first corresponding OIS-Z probe magnet 926 may form a first pair. A second OIS-Z position sensor 924 and a second corresponding OIS-Z probe magnet 926 may form a second pair that is opposite the first pair with respect to an X-Z plane that intersects the lens group 932. As indicated by the arrows on the OIS-Z probe magnets 926 in FIG. 9A (and by the hatching in FIG. 9C), the OIS-Z probe magnet 926 of the first pair may have a N-S polarity direction that is opposite that of the OIS-Z probe magnet 926 of the second pair. By having two such pairs, rotation about the system Z-axis (due to system Z-axis displacement) and/or external field effects may be cancelled out in some embodiments.

In a non-limiting embodiment, the AF position sensor arrangement 902 may include two AF position sensors 908 (e.g., two TMR sensors), the OIS-Y position sensor arrangement 904 may include an OIS-Y position sensor 922 (e.g., a Hall sensor), and the OIS-Z position sensor arrangement 906 may include two OIS-Z position sensors 924 (e.g., two TMR sensors).

Multifunction Device Examples

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, California. Other portable electronic devices, such as laptops, cameras, cell phones, or tablet computers, may also be used. It should also be understood that, in some embodiments, the device is not a portable communications device, but is a desktop computer with a camera. In some embodiments, the device is a gaming computer with orientation sensors (e.g., orientation sensors in a gaming controller). In other embodiments, the device is not a portable communications device, but is a camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Figure 10:
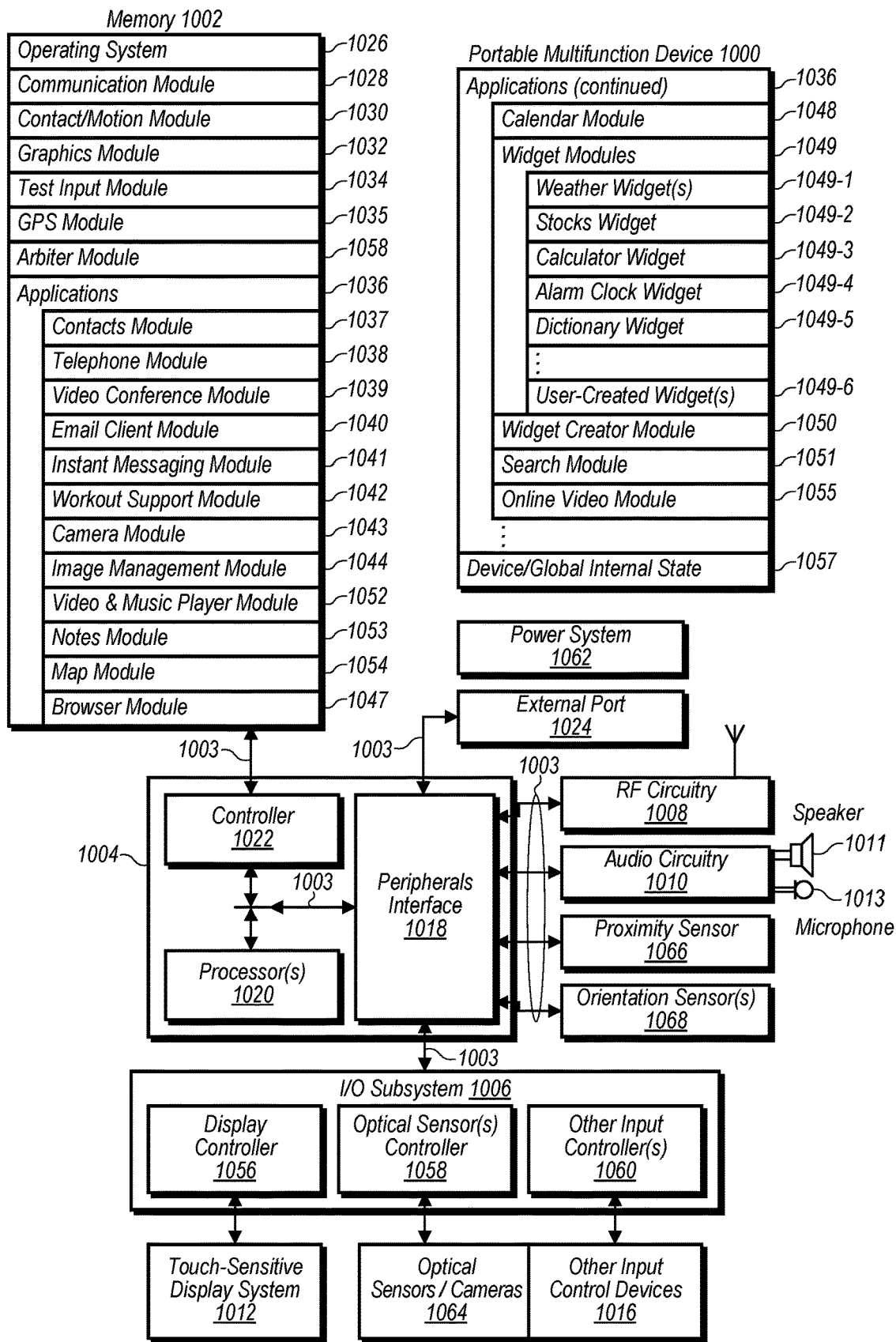
FIG. 10 illustrates a block diagram of an example portable multifunction device that may include a camera having a folded optics arrangement, in accordance with some embodiments.

Attention is now directed toward embodiments of portable devices with cameras. FIG. 10 illustrates a block diagram of an example portable multifunction device 1000 that may include one or more cameras (e.g., the cameras described above with reference to FIGS. 1-9C), in accordance with some embodiments. Cameras 1064 are sometimes called "optical sensors" for convenience, and may also be known as or called an optical sensor system. Device 1000 may include memory 1002 (which may include one or more computer readable storage mediums), memory controller 1022, one or more processing units (CPUs) 1020, peripherals interface 1018, RF circuitry 1008, audio circuitry 1010, speaker 1011, touch-sensitive display system 1012, microphone 1013, input/output (I/O) subsystem 1006, other input or control devices 1016, and external port 1024. Device 1000 may include multiple optical sensors 1064. These components may communicate over one or more communication buses or signal lines 1003.

It should be appreciated that device 1000 is only one example of a portable multifunction device, and that device 1000 may have more or fewer components than shown, may combine two or more components, or may have a different configuration or arrangement of the components. The various components shown in FIG. 10 may be implemented in hardware, software, or a combination of hardware and software, including one or more signal processing and/or application specific integrated circuits.

Memory 1002 may include high-speed random access memory and may also include non-volatile memory, such as one or more magnetic disk storage devices, flash memory devices, or other non-volatile solid-state memory devices. Access to memory 1002 by other components of device 1000, such as CPU 1020 and the peripherals interface 1018, may be controlled by memory controller 1022.

Peripherals interface 1018 can be used to couple input and output peripherals of the device to CPU 1020 and memory 1002. The one or more processors 1020 run or execute various software programs and/or sets of instructions stored in memory 1002 to perform various functions for device 1000 and to process data.

In some embodiments, peripherals interface 1018, CPU 1020, and memory controller 1022 may be implemented on a single chip, such as chip 1004. In some other embodiments, they may be implemented on separate chips.

RF (radio frequency) circuitry 1008 receives and sends RF signals, also called electromagnetic signals. RF circuitry 1008 converts electrical signals to/from electromagnetic signals and communicates with communications networks and other communications devices via the electromagnetic signals. RF circuitry 1008 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 1008 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 1010, speaker 1011, and microphone 1013 provide an audio interface between a user and device 1000. Audio circuitry 1010 receives audio data from peripherals interface 1018, converts the audio data to an electrical signal, and transmits the electrical signal to speaker 1011. Speaker 1011 converts the electrical signal to human-audible sound waves. Audio circuitry 1010 also receives electrical signals converted by microphone 1013 from sound waves. Audio circuitry 1010 converts the electrical signal to audio data and transmits the audio data to peripherals interface 1018 for processing. Audio data may be retrieved from and/or transmitted to memory 1002 and/or RF circuitry 1008 by peripherals interface 1018. In some embodiments, audio circuitry 1010 also includes a headset jack (e.g., 1112, FIG. 11). The headset jack provides an interface between audio circuitry 1010 and removable audio input/output peripherals, such as output-only headphones or a headset with both output (e.g., a headphone for one or both ears) and input (e.g., a microphone).

I/O subsystem 1006 couples input/output peripherals on device 1000, such as touch screen 1012 and other input control devices 1016, to peripherals interface 1018. I/O subsystem 1006 may include display controller 1056 and one or more input controllers 1060 for other input or control devices. The one or more input controllers 1060 receive/send electrical signals from/to other input or control devices 1016. The other input control devices 1016 may include physical buttons (e.g., push buttons, rocker buttons, etc.), dials, slider switches, joysticks, click wheels, and so forth. In some alternate embodiments, input controller(s) 1060 may be coupled to any (or none) of the following: a keyboard, infrared port, USB port, and a pointer device such as a mouse. The one or more buttons (e.g., 1108, FIG. 11) may include an up/down button for volume control of speaker 1011 and/or microphone 1013. The one or more buttons may include a push button (e.g., 1106, FIG. 11).

Touch-sensitive display 1012 provides an input interface and an output interface between the device and a user. Display controller 1056 receives and/or sends electrical signals from/to touch screen 1012. Touch screen 1012 displays visual output to the user. The visual output may include graphics, text, icons, video, and any combination thereof (collectively termed "graphics"). In some embodiments, some or all of the visual output may correspond to user-interface objects.

Touch screen 1012 has a touch-sensitive surface, sensor or set of sensors that accepts input from the user based on haptic and/or tactile contact. Touch screen 1012 and display controller 1056 (along with any associated modules and/or sets of instructions in memory 1002) detect contact (and any movement or breaking of the contact) on touch screen 1012 and converts the detected contact into interaction with user-interface objects (e.g., one or more soft keys, icons, web pages or images) that are displayed on touch screen 1012. In an example embodiment, a point of contact between touch screen 1012 and the user corresponds to a finger of the user.

Touch screen 1012 may use LCD (liquid crystal display) technology, LPD (light emitting polymer display) technology, or LED (light emitting diode) technology, although other display technologies may be used in other embodiments. Touch screen 1012 and display controller 1056 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 1012. In an example embodiment, projected mutual capacitance sensing technology is used, such as that found in the iPhone®, iPod Touch®, and iPad® from Apple Inc. of Cupertino, California.

Touch screen 1012 may have a video resolution in excess of 800 dpi. In some embodiments, the touch screen has a video resolution of approximately 860 dpi. The user may make contact with touch screen 1012 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 1000 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 1012 or an extension of the touch-sensitive surface formed by the touch screen.

Device 1000 also includes power system 1062 for powering the various components. Power system 1062 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 1000 may also include one or more optical sensors or cameras 1064. FIG. 10 shows an optical sensor 1064 coupled to optical sensor controller 1058 in I/O subsystem 1006. Optical sensor 1064 may include charge-coupled device (CCD) or complementary metal-oxide semiconductor (CMOS) phototransistors. Optical sensor 1064 receives light from the environment, projected through one or more lens, and converts the light to data representing an image. In conjunction with imaging module 1043 (also called a camera module), optical sensor 1064 may capture still images or video. In some embodiments, an optical sensor 1064 is located on the back of device 1000, opposite touch screen display 1012 on the front of the device, so that the touch screen display 1012 may be used as a viewfinder for still and/or video image acquisition. In some embodiments, another optical sensor is located on the front of the device so that the user's image may be obtained for videoconferencing while the user views the other video conference participants on the touch screen display.

Device 1000 may also include one or more proximity sensors 1066. FIG. 10 shows proximity sensor 1066 coupled to peripherals interface 1018. Alternately, proximity sensor 1066 may be coupled to input controller 1060 in I/O subsystem 1006. In some embodiments, the proximity sensor 1066 turns off and disables touch screen 1012 when the multifunction device 1000 is placed near the user's ear (e.g., when the user is making a phone call).

Device 1000 includes one or more orientation sensors 1068. In some embodiments, the one or more orientation sensors 1068 include one or more accelerometers (e.g., one or more linear accelerometers and/or one or more rotational accelerometers). In some embodiments, the one or more orientation sensors 1068 include one or more gyroscopes. In some embodiments, the one or more orientation sensors 1068 include one or more magnetometers. In some embodiments, the one or more orientation sensors 1068 include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 1000. In some embodiments, the one or more orientation sensors 1068 include any combination of orientation/rotation sensors. FIG. 10 shows the one or more orientation sensors 1068 coupled to peripherals interface 1018. Alternately, the one or more orientation sensors 1068 may be coupled to an input controller 1060 in I/O subsystem 1006. In some embodiments, information is displayed on the touch screen display 1012 in a portrait view or a landscape view based on an analysis of data received from the one or more orientation sensors 1068.

In some embodiments, the software components stored in memory 1002 include operating system 1026, communication module (or set of instructions) 1028, contact/motion module (or set of instructions) 1030, graphics module (or set of instructions) 1032, text input module (or set of instructions) 1034, Global Positioning System (GPS) module (or set of instructions) 1035, arbiter module 1058 and applications (or sets of instructions) 1036. Furthermore, in some embodiments memory 1002 stores device/global internal state 1057. Device/global internal state 1057 includes one or more of: active application state, indicating which applications, if any, are currently active; display state, indicating what applications, views or other information occupy various regions of touch screen display 1012; sensor state, including information obtained from the device's various sensors and input control devices 1016; and location information concerning the device's location and/or attitude.

Operating system 1026 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 1028 facilitates communication with other devices over one or more external ports 1024 and also includes various software components for handling data received by RF circuitry 1008 and/or external port 1024. External port 1024 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector.

Contact/motion module 1030 may detect contact with touch screen 1012 (in conjunction with display controller 1056) and other touch sensitive devices (e.g., a touchpad or physical click wheel). Contact/motion module 1030 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 1030 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 1030 and display controller 1056 detect contact on a touchpad.

Contact/motion module 1030 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 1032 includes various known software components for rendering and displaying graphics on touch screen 1012 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 1032 stores data representing graphics to be used. Each graphic may be assigned a corresponding code. Graphics module 1032 receives, from applications etc., one or more codes specifying graphics to be displayed along with, if necessary, coordinate data and other graphic property data, and then generates screen image data to output to display controller 1056.

Text input module 1034, which may be a component of graphics module 1032, provides soft keyboards for entering text in various applications (e.g., contacts 1037, e-mail 1040, IM 1041, browser 1047, and any other application that needs text input).

GPS module 1035 determines the location of the device and provides this information for use in various applications (e.g., to telephone 1038 for use in location-based dialing, to camera 1043 as picture/video metadata, and to applications that provide location-based services such as weather widgets, local yellow page widgets, and map/navigation widgets).

Applications 1036 may include the following modules (or sets of instructions), or a subset or superset thereof:
- contacts module 1037 (sometimes called an address book or contact list);
- telephone module 1038;
- video conferencing module 1039;
- e-mail client module 1040;
- instant messaging (IM) module 1041;
- workout support module 1042;
- camera module 1043 for still and/or video images;
- image management module 1044;
- browser module 1047;
- calendar module 1048;
- widget modules 1049, which may include one or more of: weather widget 1049-1, stocks widget 1049-2, calculator widget 1049-3, alarm clock widget 1049-4, dictionary widget 1049-5, and other widgets obtained by the user, as well as user-created widgets 1049-6;
- widget creator module 1050 for making user-created widgets 1049-6;
- search module 1051;
- video and music player module 1052, which may be made up of a video player module and a music player module;
- notes module 1053;
- map module 1054; and/or
- online video module 1055.

Examples of other applications 1036 that may be stored in memory 1002 include other word processing applications, other image editing applications, drawing applications, presentation applications, JAVA-enabled applications, encryption, digital rights management, voice recognition, and voice replication.

In conjunction with touch screen 1012, display controller 1056, contact module 1030, graphics module 1032, and text input module 1034, contacts module 1037 may be used to manage an address book or contact list (e.g., stored in application internal state 1057), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 1038, video conference 1039, e-mail 1040, or IM 1041; and so forth.

In conjunction with RF circuitry 1008, audio circuitry 1010, speaker 1011, microphone 1013, touch screen 1012, display controller 1056, contact module 1030, graphics module 1032, and text input module 1034, telephone module 1038 may be used to enter a sequence of characters corresponding to a telephone number, access one or more telephone numbers in address book 1037, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 1008, audio circuitry 1010, speaker 1011, microphone 1013, touch screen 1012, display controller 1056, optical sensor 1064, optical sensor controller 1058, contact module 1030, graphics module 1032, text input module 1034, contact list 1037, and telephone module 1038, videoconferencing module 1039 includes executable instructions to initiate, conduct, and terminate a video conference between a user and one or more other participants in accordance with user instructions.

In conjunction with RF circuitry 1008, touch screen 1012, display controller 1056, contact module 1030, graphics module 1032, and text input module 1034, e-mail client module 1040 includes executable instructions to create, send, receive, and manage e-mail in response to user instructions. In conjunction with image management module 1044, e-mail client module 1040 makes it very easy to create and send e-mails with still or video images taken with camera module 1043.

In conjunction with RF circuitry 1008, touch screen 1012, display controller 1056, contact module 1030, graphics module 1032, and text input module 1034, the instant messaging module 1041 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 1008, touch screen 1012, display controller 1056, contact module 1030, graphics module 1032, text input module 1034, GPS module 1035, map module 1054, and music player module 1046, workout support module 1042 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 1012, display controller 1056, optical sensor(s) 1064, optical sensor controller 1058, contact module 1030, graphics module 1032, and image management module 1044, camera module 1043 includes executable instructions to capture still images or video (including a video stream) and store them into memory 1002, modify characteristics of a still image or video, or delete a still image or video from memory 1002.

In conjunction with touch screen 1012, display controller 1056, contact module 1030, graphics module 1032, text input module 1034, and camera module 1043, image management module 1044 includes executable instructions to arrange, modify (e.g., edit), or otherwise manipulate, label, delete, present (e.g., in a digital slide show or album), and store still and/or video images.

In conjunction with RF circuitry 1008, touch screen 1012, display system controller 1056, contact module 1030, graphics module 1032, and text input module 1034, browser module 1047 includes executable instructions to browse the Internet in accordance with user instructions, including searching, linking to, receiving, and displaying web pages or portions thereof, as well as attachments and other files linked to web pages.

In conjunction with RF circuitry 1008, touch screen 1012, display system controller 1056, contact module 1030, graphics module 1032, text input module 1034, e-mail client module 1040, and browser module 1047, calendar module 1048 includes executable instructions to create, display, modify, and store calendars and data associated with calendars (e.g., calendar entries, to do lists, etc.) in accordance with user instructions.

In conjunction with RF circuitry 1008, touch screen 1012, display system controller 1056, contact module 1030, graphics module 1032, text input module 1034, and browser module 1047, widget modules 1049 are mini-applications that may be downloaded and used by a user (e.g., weather widget 549-1, stocks widget 549-2, calculator widget 1049-3, alarm clock widget 1049-4, and dictionary widget 1049-5) or created by the user (e.g., user-created widget 1049-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 1008, touch screen 1012, display system controller 1056, contact module 1030, graphics module 1032, text input module 1034, and browser module 1047, the widget creator module 1050 may be used by a user to create widgets (e.g., turning a user-specified portion of a web page into a widget).

In conjunction with touch screen 1012, display system controller 1056, contact module 1030, graphics module 1032, and text input module 1034, search module 1051 includes executable instructions to search for text, music, sound, image, video, and/or other files in memory 1002 that match one or more search criteria (e.g., one or more user-specified search terms) in accordance with user instructions.

In conjunction with touch screen 1012, display system controller 1056, contact module 1030, graphics module 1032, audio circuitry 1010, speaker 1011, RF circuitry 1008, and browser module 1047, video and music player module 1052 includes executable instructions that allow the user to download and play back recorded music and other sound files stored in one or more file formats, such as MP3 or AAC files, and executable instructions to display, present or otherwise play back videos (e.g., on touch screen 1012 or on an external, connected display via external port 1024). In some embodiments, device 1000 may include the functionality of an MP3 player.

In conjunction with touch screen 1012, display controller 1056, contact module 1030, graphics module 1032, and text input module 1034, notes module 1053 includes executable instructions to create and manage notes, to do lists, and the like in accordance with user instructions.

In conjunction with RF circuitry 1008, touch screen 1012, display system controller 1056, contact module 1030, graphics module 1032, text input module 1034, GPS module 1035, and browser module 1047, map module 1054 may be used to receive, display, modify, and store maps and data associated with maps (e.g., driving directions; data on stores and other points of interest at or near a particular location; and other location-based data) in accordance with user instructions.

In conjunction with touch screen 1012, display system controller 1056, contact module 1030, graphics module 1032, audio circuitry 1010, speaker 1011, RF circuitry 1008, text input module 1034, e-mail client module 1040, and browser module 1047, online video module 1055 includes instructions that allow the user to access, browse, receive (e.g., by streaming and/or download), play back (e.g., on the touch screen or on an external, connected display via external port 1024), send an e-mail with a link to a particular online video, and otherwise manage online videos in one or more file formats, such as H.264. In some embodiments, instant messaging module 1041, rather than e-mail client module 1040, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 1002 may store a subset of the modules and data structures identified above. Furthermore, memory 1002 may store additional modules and data structures not described above.

In some embodiments, device 1000 is a device where operation of a predefined set of functions on the device is performed exclusively through a touch screen and/or a touchpad. By using a touch screen and/or a touchpad as the primary input control device for operation of device 1000, the number of physical input control devices (such as push buttons, dials, and the like) on device 1000 may be reduced.

The predefined set of functions that may be performed exclusively through a touch screen and/or a touchpad include navigation between user interfaces. In some embodiments, the touchpad, when touched by the user, navigates device 1000 to a main, home, or root menu from any user interface that may be displayed on device 1000. In such embodiments, the touchpad may be referred to as a "menu button." In some other embodiments, the menu button may be a physical push button or other physical input control device instead of a touchpad.

Figure 11:
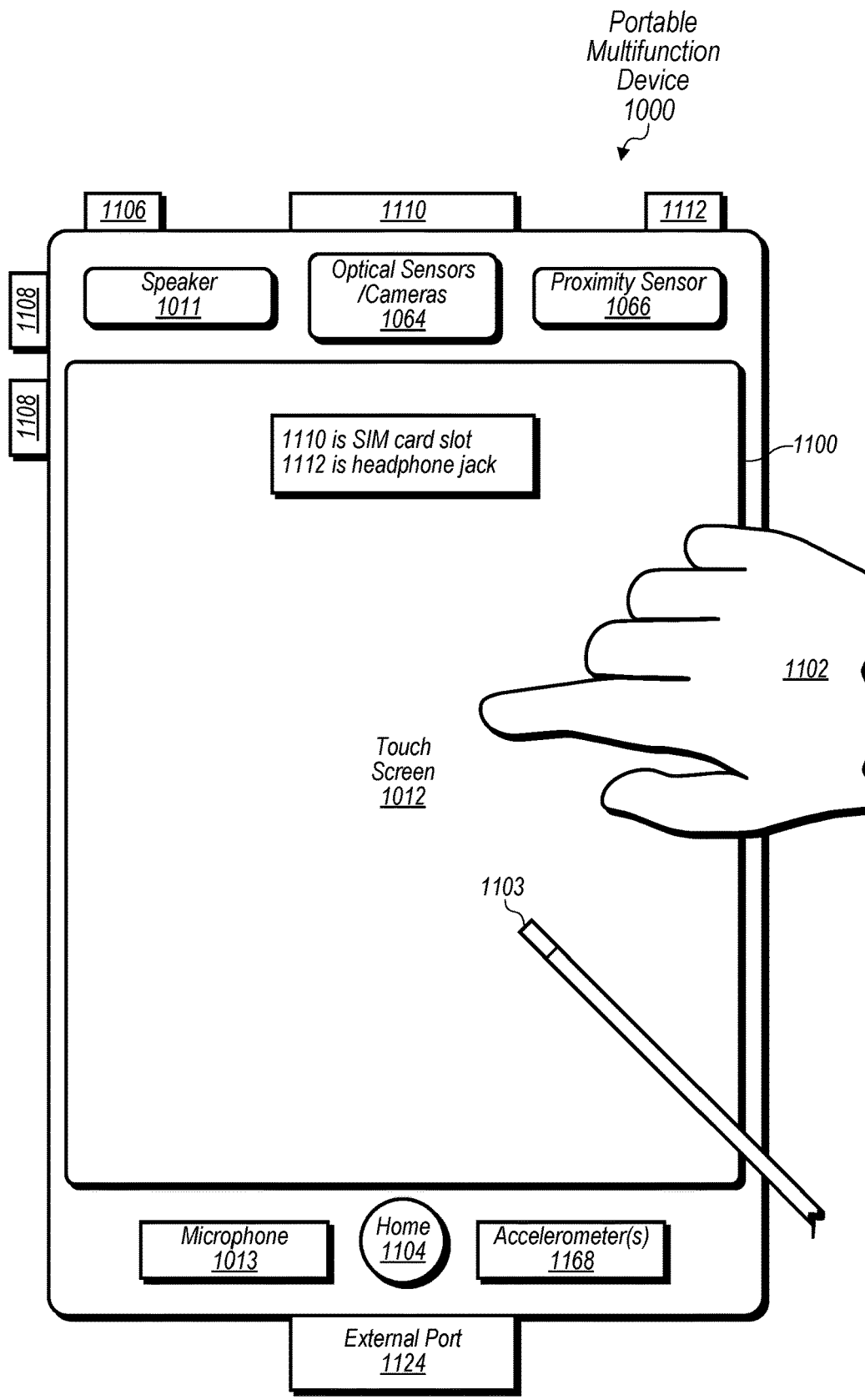
FIG. 11 depicts an example portable multifunction device that may include a camera having a folded optics arrangement, in accordance with some embodiments.

FIG. 11 depicts illustrates an example portable multifunction device 1000 that may include one or more cameras (e.g., the cameras described above with reference to FIGS. 1-9C), in accordance with some embodiments. The device 1000 may have a touch screen 1012. The touch screen 1012 may display one or more graphics within user interface (UI) 1100. In this embodiment, as well as others described below, a user may select one or more of the graphics by making a gesture on the graphics, for example, with one or more fingers 1102 (not drawn to scale in the figure) or one or more styluses 1103 (not drawn to scale in the figure).

Device 1000 may also include one or more physical buttons, such as "home" or menu button 1104. As described previously, menu button 1104 may be used to navigate to any application 1036 in a set of applications that may be executed on device 1000. Alternatively, in some embodiments, the menu button 1104 is implemented as a soft key in a GUI displayed on touch screen 1012.

In one embodiment, device 1000 includes touch screen 1012, menu button 1104, push button 1106 for powering the device on/off and locking the device, volume adjustment button(s) 1108, Subscriber Identity Module (SIM) card slot 1110, head set jack 1112, and docking/charging external port 1124. Push button 1106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 1000 also may accept verbal input for activation or deactivation of some functions through microphone 1013.

It should be noted that, although many of the examples herein are given with reference to optical sensor(s)/ camera(s) 1064 (on the front of a device), one or more rear-facing cameras or optical sensors that are pointed opposite from the display may be used instead of, or in addition to, an optical sensor(s)/camera(s) 1064 on the front of a device.

Example Computer System

Figure 12:
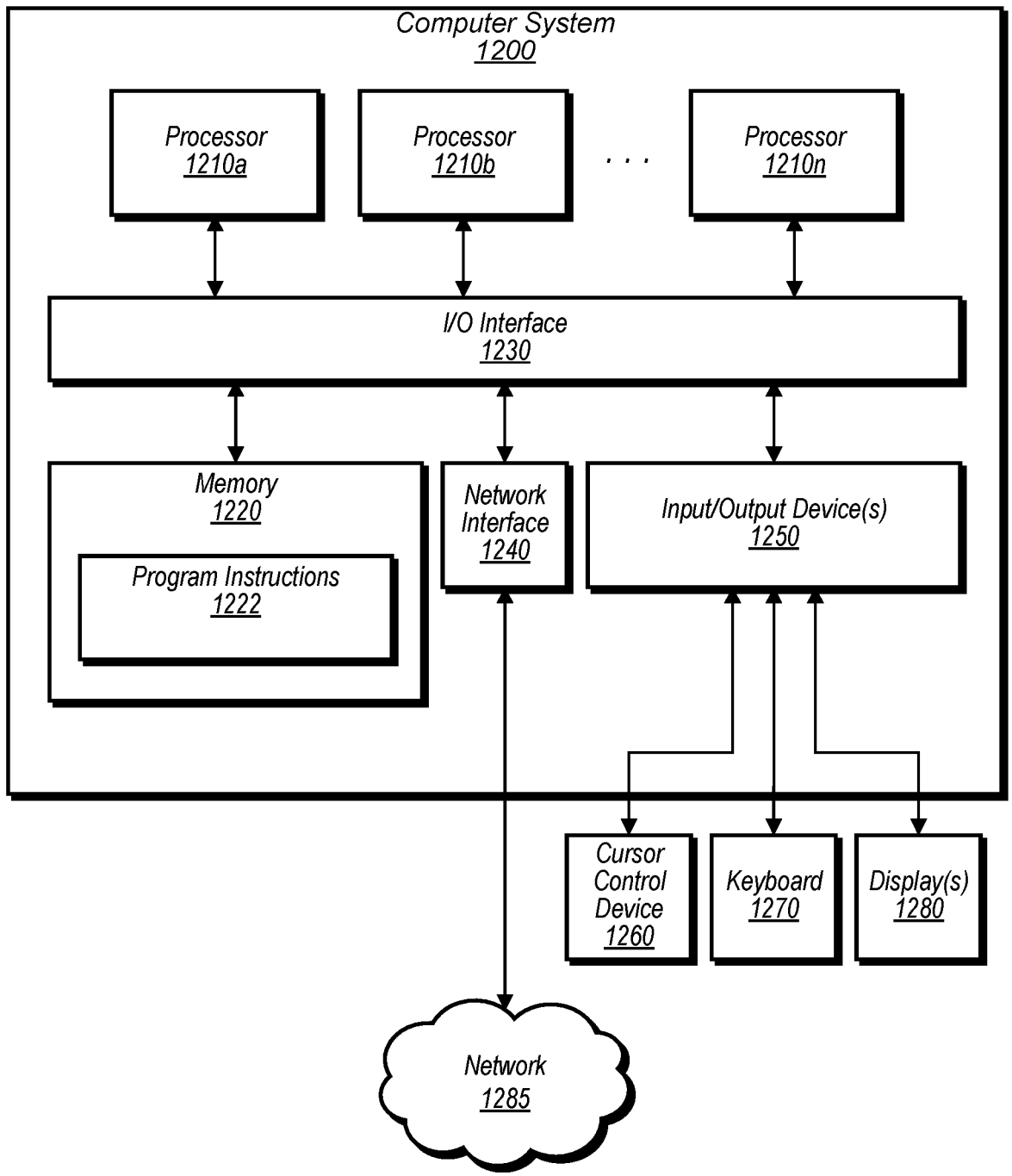
FIG. 12 illustrates an example computer system that may include a camera having a folded optics arrangement, in accordance with some embodiments.

FIG. 12 illustrates an example computer system 1200 that may include one or more cameras (e.g., the cameras described above with reference to FIGS. 1-9C), according to some embodiments. The computer system 1200 may be configured to execute any or all of the embodiments described above. In different embodiments, computer system 1200 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a camera motion control system as described herein, including embodiments of magnetic position sensing, as described herein may be executed in one or more computer systems 1200, which may interact with various other devices. Note that any component, action, or functionality described above with respect to FIGS. 1-11 may be implemented on one or more computers configured as computer system 1200 of FIG. 12, according to various embodiments. In the illustrated embodiment, computer system 1200 includes one or more processors 1210 coupled to a system memory 1220 via an input/output (I/O) interface 1230. Computer system 1200 further includes a network interface 1240 coupled to I/O interface 1230, and one or more input/output devices 1250, such as cursor control device 1260, keyboard 1270, and display(s) 1280. In some cases, it is contemplated that embodiments may be implemented using a single instance of computer system 1200, while in other embodiments multiple such systems, or multiple nodes making up computer system 1200, may be configured to host different portions or instances of embodiments. For example, in one embodiment some elements may be implemented via one or more nodes of computer system 1200 that are distinct from those nodes implementing other elements.

In various embodiments, computer system 1200 may be a uniprocessor system including one processor 1210, or a multiprocessor system including several processors 1210 (e.g., two, four, eight, or another suitable number). Processors 1210 may be any suitable processor capable of executing instructions. For example, in various embodiments processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA.

System memory 1220 may be configured to store camera control program instructions 1222 and/or camera control data accessible by processor 1210. In various embodiments, system memory 1220 may be implemented using any suitable memory technology, such as static random access memory (SRAM), synchronous dynamic RAM (SDRAM), nonvolatile/Flash-type memory, or any other type of memory. In the illustrated embodiment, program instructions 1222 may be configured to implement a lens control application 1224 incorporating any of the functionality described above. Additionally, existing camera control data 1232 of memory 1220 may include any of the information or data structures described above. In some embodiments, program instructions and/or data may be received, sent or stored upon different types of computer-accessible media or on similar media separate from system memory 1220 or computer system 1200. While computer system 1200 is described as implementing the functionality of functional blocks of previous Figures, any of the functionality described herein may be implemented via such a computer system.

In one embodiment, I/O interface 1230 may be configured to coordinate I/O traffic between processor 1210, system memory 1220, and any peripheral devices in the device, including network interface 1240 or other peripheral interfaces, such as input/output devices 1250. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computer system 1200 and other devices attached to a network 1285 (e.g., carrier or agent devices) or between nodes of computer system 1200. Network 1285 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1240 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1250 may, in some embodiments, include one or more display terminals, keyboards, keypads, touchpads, scanning devices, voice or optical recognition devices, or any other devices suitable for entering or accessing data by one or more computer systems 1200. Multiple input/output devices 1250 may be present in computer system 1200 or may be distributed on various nodes of computer system 1200. In some embodiments, similar input/output devices may be separate from computer system 1200 and may interact with one or more nodes of computer system 1200 through a wired or wireless connection, such as over network interface 1240.

As shown in FIG. 12, memory 1220 may include program instructions 1222, which may be processor-executable to implement any element or action described above. In one embodiment, the program instructions may implement the methods described above. In other embodiments, different elements and data may be included. Note that data may include any data or information described above.

Those skilled in the art will appreciate that computer system 1200 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1200 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1200 may be transmitted to computer system 1200 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations.

Additional Descriptions of Embodiments (Example Clauses):

Clause 1: A camera, comprising: a folded optics arrangement to fold a path of light, the folded optics arrangement comprising: a prism; and a lens group comprising one or more lens elements that define an optical axis; a base structure, comprising: a first portion below the prism and the lens group, wherein the first portion defines a first plane parallel to the optical axis; and a second portion that defines a second plane orthogonal to the optical axis; an image sensor to capture light that has passed through the prism and the lens group, wherein the image sensor is coupled to the second portion of the base structure such that the image sensor is oriented orthogonal to the optical axis; and an actuator module to move the lens group, relative to the image sensor, in multiple directions.

Clause 2: The camera of Clause 1, wherein the first portion of the base structure defines a recess for receiving at least a portion of the lens group.

Clause 3: The camera of any of Clauses 1 or 2, further comprising: a substrate to which the image sensor is attached, the substrate being attached to the second portion of the base structure; and a stiffener to provide structural support to at least one of the substrate or the second portion of the base structure, wherein the stiffener comprises a base portion defining a plane that is parallel to the image sensor.

Clause 4: The camera of any of Clauses 1-3, further comprising: a flex circuit board attached to a top surface of the first portion of the base structure, wherein the top surface faces the folded optics arrangement.

Clause 5: The camera of any of Clauses 1-4, wherein the actuator module comprises: one or more coils on the flex circuit board.

Clause 6: The camera of any of Clauses 1-5, further comprising: a carrier arrangement, comprising: an inner carrier structure coupled to the lens group; and an outer carrier structure coupled to the inner carrier structure; wherein the actuator module is to: move the inner carrier structure and the outer carrier structure together, relative to the image sensor, in at least a first direction; and move the inner carrier structure relative to the outer carrier structure in at least a second direction that is orthogonal to the first direction.

Clause 7: The camera of Clause 6, wherein the actuator module comprises: an autofocus (AF) voice coil motor (VCM) actuator to move the inner carrier structure and the outer carrier structure together, relative to the image sensor, in at least the first direction; a first optical image stabilization (OIS) VCM actuator to move the inner carrier structure relative to the outer carrier structure in at least the second direction that is orthogonal to the first direction; and a second OIS VCM actuator to move the inner carrier structure and the outer carrier structure together, relative to the image sensor, in at least a third direction that is orthogonal to the first direction and the second direction.

Clause 8: The camera of any of Clauses 6 or 7, wherein: the actuator module comprises: one or more magnets; and one or more coils; the inner carrier structure comprises a lens carrier to which at least one coil of the one or more coils is attached; the outer carrier structure comprises a magnet holder to which at least one magnet of the one or more magnets is attached; and the outer carrier structure at least partially encircles the folded optics arrangement.

Clause 9: The camera of Clauses 6-8, further comprising: a suspension arrangement to suspend the lens group and allow movement of the lens group along multiple axes, the suspension arrangement comprising: a leaf spring attached to the inner carrier structure and the outer carrier structure, so as to allow movement of the lens group and the inner carrier structure together, relative to the outer carrier structure, in at least the second direction; and suspension wires to allow movement of the lens group, the inner carrier structure, and the outer carrier structure together, relative to the image sensor, in one or more directions orthogonal to the second direction, wherein a suspension wire of the suspension wires comprises: a first end portion attached to the leaf spring; and a second end portion attached to a fixed structure that is stationary relative to movement of the lens group.

Clause 10: A device, comprising: one or more processors; memory storing program instructions executable by the one or more processors to control operation of a camera; and the camera, comprising: a folded optics arrangement to fold a path of light, the folded optics arrangement comprising: a prism; and a lens group comprising one or more lens elements that define an optical axis; a base structure, comprising: a first portion below the prism and the lens group, wherein the first portion defines a first plane parallel to the optical axis; and a second portion that defines a second plane orthogonal to the optical axis; an image sensor to capture light that has passed through the prism and the lens group, wherein the image sensor is coupled to the second portion of the base structure such that the image sensor is oriented orthogonal to the optical axis; and an actuator module to move the lens group, relative to the image sensor, in multiple directions.

Clause 11: The device of Clause 10, further comprising: a carrier arrangement, comprising: an inner carrier structure coupled to the lens group; and an outer carrier structure coupled to the inner carrier structure; wherein the actuator module is to: move the inner carrier structure and the outer carrier structure together, relative to the image sensor, in at least a first direction; and move the inner carrier structure relative to the outer carrier structure in at least a second direction that is orthogonal to the first direction.

Clause 12: The device of Clause 11, wherein one or more of the inner carrier structure or the lens group is at least partially disposed within a recess defined by the first portion of the base structure.

Clause 13: The device of any of Clauses 11 or 12, wherein: the actuator module comprises: one or more magnets; and one or more coils; the inner carrier structure comprises a lens carrier to which at least one coil of the one or more coils is attached; the outer carrier structure comprises a magnet holder to which at least one magnet of the one or more magnets is attached; and the outer carrier structure at least partially encircles the folded optics arrangement.

Clause 14: The device of Clause 13, wherein at least one other coil of the one or more coils is attached to the magnet holder.

Clause 15: The device of any of Clauses 11-14, wherein the outer carrier structure at least partially encircles the folded optics arrangement.

Clause 16: The device of any of clauses 11-15, wherein the camera further comprises: a suspension arrangement to suspend the lens group and allow movement of the lens group in the multiple directions, the suspension arrangement comprising: a leaf spring attached to the inner carrier structure and the outer carrier structure, so as to allow movement of the lens group and the inner carrier structure together, relative to the outer carrier structure, in at least the second direction; and suspension wires to allow movement of the lens group, the inner carrier structure, and the outer carrier structure together, relative to the image sensor, in one or more directions orthogonal to the second direction, wherein a suspension wire of the suspension wires comprises: a first end portion attached to the leaf spring; and a second end portion attached to a fixed structure that is stationary relative to movement of the lens group.

Clause 17: The device of any of Clauses 10-16, wherein: the actuator module comprises: an autofocus (AF) voice coil motor (VCM) actuator to move the inner carrier structure and the outer carrier structure together, relative to the image sensor, in at least the first direction; a first optical image stabilization (OIS) VCM actuator to move the inner carrier structure relative to the outer carrier structure in at least the second direction that is orthogonal to the first direction; and a second OIS VCM actuator to move the inner carrier structure and the outer carrier structure together, relative to the image sensor, in at least a third direction that is orthogonal to the first direction and the second direction.

Clause 18: The device of Clause 17, wherein the one or more processors are further to: cause the AF VCM actuator to move the lens group in at least the first direction; cause the first OIS VCM actuator to move the lens group in at least the second direction; and cause the second OIS VCM actuator to move the lens group in at least the third direction.

Clause 19: The device of any of Clauses 10-18, wherein: the prism comprises: an object side through which light enters the prism; and a reflecting surface side comprising a reflective surface to redirect the light towards the lens group; the reflecting surface side is angled relative to the object side of the prism; and the actuator module comprises a voice coil motor (VCM) actuator having at least one magnet and at least one coil disposed within a space under the reflecting surface side.

Clause 20: A folded optics system, comprising: a lens group comprising one or more lens elements that define an optical axis; a prism to redirect light to the lens group; a base structure, comprising: a first portion below the prism and the lens group, wherein the first portion defines a first plane parallel to the optical axis; and a second portion that defines a second plane orthogonal to the optical axis, wherein the second portion is to couple with an image sensor such that the image sensor is oriented orthogonal to the optical axis; and an actuator module to move the lens group, relative to the image sensor, in multiple directions.

Clause 21: The folded optics system of Clause 20, wherein the first portion of the base structure defines a recess for receiving at least a portion of the lens group.

Clause 22: The folded optics system of any of Clauses 20 or 21, wherein: the second portion comprises: an object side facing the lens group; and an image side to face the image sensor; and the second portion of the base structure defines a window that allows light to pass from the lens group to the image sensor.

Clause 23: The folded optics system of any of Clauses 20-22, further comprising: a substrate to attach to the image sensor, the substrate being attached to the second portion of the base structure; and a stiffener to provide structural support to at least one of the substrate or the second portion of the base structure, wherein the stiffener comprises a base portion defining a plane that is parallel to the image sensor.

Clause 24: The folded optics system of Clause 23, wherein the stiffener further comprises: one or more tab portions that extend from the base portion and that are oriented at a non-zero angle relative to the base portion.

Clause 25: The folded optics system of Clause 24, wherein the one or more tab portions comprise multiple tab portions that are orthogonal to the base portion.

Clause 26: The folded optics system of any of Clauses 20-25, wherein: the first portion of the base structure comprises a top surface to couple with a flex circuit board; and the top surface faces the lens group and the prism.

Clause 27: The folded optics system of any of Clauses 20-27, further comprising: a carrier arrangement, comprising: an inner carrier structure coupled to the lens group; and an outer carrier structure coupled to the inner carrier structure; wherein the actuator module is to: move the inner carrier structure and the outer carrier structure together, relative to the image sensor, in at least a first direction; and move the inner carrier structure relative to the outer carrier structure in at least a second direction that is orthogonal to the first direction.

Clause 28: The folded optics system of Clause 27, wherein the actuator module comprises: an autofocus (AF) voice coil motor (VCM) actuator to move the inner carrier structure and the outer carrier structure together, relative to the image sensor, in at least the first direction; a first optical image stabilization (OIS) VCM actuator to move the inner carrier structure relative to the outer carrier structure in at least the second direction that is orthogonal to the first direction; and a second OIS VCM actuator to move the inner carrier structure and the outer carrier structure together, relative to the image sensor, in at least a third direction that is orthogonal to the first direction and the second direction.

Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera, comprising:
    a folded optics arrangement to fold a path of light, the folded optics arrangement comprising:
        a light path folding element; and
        a lens group comprising one or more lens elements that define an optical axis;
    a lens carrier coupled to the lens group and partially surrounding the lens group;
    an image sensor to capture light folded by the light path folding element and that has passed through the lens group, wherein the image sensor is coupled to a stationary structure in the camera such that the image sensor is oriented orthogonal to the optical axis;
    an actuator module to move the lens carrier and the lens group, relative to the image sensor, in multiple directions;
    a suspension arrangement configured to suspend the lens carrier for movement, comprising:
        a set of top springs attached to the lens carrier and that define a first plane parallel to the optical axis; and
        a set of bottom springs attached to the lens carrier and that define a second plane parallel to the optical axis; and
    a stationary base structure below the light path folding element and the lens group, the base structure defining a recess for receiving at least a portion of the lens carrier.

2. The camera of claim 1, wherein the stationary base structure comprises:
    a first portion that defines a third plane parallel to the optical axis.

3. The camera of claim 2, wherein the stationary base structure further comprises a second portion that defines a fourth plane orthogonal to the optical axis.

4. The camera of claim 3, further comprising:
    a substrate to which the image sensor is attached, the substrate being attached to the second portion of the stationary base structure.

5. The camera of claim 4, further comprising:
    a stiffener to provide structural support to at least one of the substrate or the second portion of the stationary base structure, wherein the stiffener comprises a base portion defining a fifth plane that is parallel to the image sensor.

6. The camera of claim 2, further comprising:
    a flex circuit board attached to a top surface of the first portion of the stationary base structure, wherein the top surface faces the folded optics arrangement.

7. The camera of claim 6, wherein the actuator module comprises:
    one or more coils on the flex circuit board.

8. A device, comprising:
    one or more processors;
    memory storing program instructions executable by the one or more processors to control operation of a camera; and
    the camera, comprising:
        a folded optics arrangement to fold a path of light, the folded optics arrangement comprising:
            a light path folding element; and
            a lens group comprising one or more lens elements that define an optical axis;
        a lens carrier coupled to the lens group and partially surrounding the lens group;
        an image sensor to capture light folded by the light path folding element and that has passed through the lens group, wherein the image sensor is coupled to a stationary structure in the camera such that the image sensor is oriented orthogonal to the optical axis;
        an actuator module to move the lens group, relative to the image sensor, in multiple directions;
        a suspension arrangement configured to suspend the lens carrier for movement, comprising:
            a set of top springs attached to the lens carrier and that define a first plane parallel to the optical axis; and
            a set of bottom springs attached to the lens carrier and that define a second plane parallel to the optical axis; and
        a stationary base structure below the light path folding element and the lens group, the stationary base structure defining a recess for receiving at least a portion of the lens carrier.

9. The device of claim 8, wherein the stationary base structure comprises:
    a first portion that defines a third plane parallel to the optical axis.

10. The device of claim 9, wherein the stationary base structure further comprises:
    a second portion that defines a fourth plane orthogonal to the optical axis.

11. The device of claim 10, further comprising:
    a substrate to which the image sensor is attached, the substrate being attached to the second portion of the stationary base structure.

12. The device of claim 11, further comprising:
    a stiffener to provide structural support to at least one of the substrate or the second portion of the stationary base structure, wherein the stiffener comprises a base portion defining a fifth plane that is parallel to the image sensor.

13. The device of claim 9, further comprising:
a flex circuit board attached to a top surface of the first portion of the stationary base structure, wherein the top surface faces the folded optics arrangement.

14. The device of claim 13, wherein the actuator module comprises:
one or more coils on the flex circuit board.

15. A folded optics system, comprising:
a light path folding element;
a lens group comprising one or more lens elements that define an optical axis;
a lens carrier coupled to the lens group and partially surrounding the lens group;
a suspension arrangement configured to suspend the lens carrier for movement, comprising:
a set of top springs attached to the lens carrier and that define a first plane parallel to the optical axis; and
a set of bottom springs attached to the lens carrier and that define a second plane parallel to the optical axis;
a stationary base structure below the light path folding element and the lens group, the stationary base structure defining a recess for receiving at least a portion of the lens carrier; and
an actuator module to move the lens carrier and the lens group, relative to the stationary base structure.

16. The folded optics system of claim 15, wherein the stationary base structure comprises:
a first portion that defines a third plane parallel to the optical axis; and
a second portion that defines a fourth plane orthogonal to the optical axis.

17. The folded optics system of claim 16, further comprising:
a substrate to which an image sensor is attached, the substrate being attached to the second portion of the stationary base structure.

18. The folded optics system of claim 17, further comprising:
a stiffener to provide structural support to at least one of the substrate or the second portion of the stationary base structure, wherein the stiffener comprises a base portion defining a fifth plane that is parallel to the image sensor.

19. The folded optics system of claim 16, further comprising:
a flex circuit board attached to a top surface of the first portion of the stationary base structure, wherein the top surface faces the folded optics arrangement.

20. The folded optics system of claim 15, wherein the actuator module is configured to move the lens carrier and the lens group, relative to the base structure, in multiple directions.

* * * * *